United States Patent
Lee et al.

(10) Patent No.: US 9,489,129 B2
(45) Date of Patent: Nov. 8, 2016

(54) MOBILE TERMINAL SETTING FIRST AND SECOND CONTROL COMMANDS TO USER DIVIDED FIRST AND SECOND AREAS OF A BACKSIDE TOUCH SCREEN

(71) Applicant: LG ELECTRONICS INC., Seoul (KR)

(72) Inventors: Byunghwa Lee, Seoul (KR); Choonghwan Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/629,029

(22) Filed: Feb. 23, 2015

(65) Prior Publication Data
US 2016/0048288 A1 Feb. 18, 2016

(30) Foreign Application Priority Data
Aug. 13, 2014 (KR) ........................ 10-2014-0104892

(51) Int. Cl.
| | |
|---|---|
| *G06F 3/0488* | (2013.01) |
| *G06F 1/16* | (2006.01) |
| *G06F 3/01* | (2006.01) |
| *G06F 3/0354* | (2013.01) |
| *G06F 3/041* | (2006.01) |
| *G06F 3/0486* | (2013.01) |

(Continued)

(52) U.S. Cl.
CPC ......... *G06F 3/04886* (2013.01); *G06F 1/1613* (2013.01); *G06F 1/1692* (2013.01); *G06F 3/017* (2013.01); *G06F 3/03547* (2013.01); *G06F 3/0412* (2013.01); *G06F 3/0416* (2013.01); *G06F 3/0486* (2013.01); *G06F 3/0488* (2013.01); *G06F 3/04883* (2013.01); *G06F 21/70* (2013.01); *H04M 1/0266* (2013.01); *G06F 2203/04104* (2013.01); *G06F 2203/04803* (2013.01); *G06F 2203/04808* (2013.01)

(58) Field of Classification Search
CPC ............ G06F 3/0488; G06F 3/03547; G06F 3/0412; G06F 3/0416; G06F 3/0486; G06F 3/04886; G06F 21/70; G06F 1/1671; G06F 2203/04808; G06F 2203/04803; G06F 2203/04104; G06F 2203/04101; G06F 2203/04106; G06F 3/0236; G06F 3/017; G06F 3/04847; G06F 3/0354; H04M 1/0266; H04M 2250/16; H04M 2250/52
See application file for complete search history.

(56) References Cited

U.S. PATENT DOCUMENTS

| | | | |
|---|---|---|---|
| 2006/0197750 A1* | 9/2006 | Kerr et al. ............ | G06F 1/1626 345/173 |
| 2012/0162358 A1 | 6/2012 | Choi | |

(Continued)

FOREIGN PATENT DOCUMENTS

WO    WO 2004/114636 A1    12/2004

*Primary Examiner* — Magdi Elhag
(74) *Attorney, Agent, or Firm* — Birch, Stewart, Kolasch & Birch, LLP

(57) ABSTRACT

A mobile terminal comprising: a case having a front surface and a rear surface; a touch screen and first touch pad provided in the front surface of the case; a second touch pad provided in the rear surface of the case; and a controller configured to: divide an area of the second touch pad into at least first and second control command areas based on a touch point of a basic touch input on the second touch pad, set first and second control commands to the first and second command areas, respectively, control the mobile terminal according to the first control command in response to an additional touch input in the first control command area, and control the mobile terminal according to the second control command in response to an additional touch input in the first control command area.

15 Claims, 46 Drawing Sheets

(51) Int. Cl.
*G06F 21/70* (2013.01)
*H04M 1/02* (2006.01)

(56) References Cited

U.S. PATENT DOCUMENTS

| | | | |
|---|---|---|---|
| 2014/0123080 A1* | 5/2014 | Gan | G06F 3/0481 715/863 |
| 2014/0123081 A1* | 5/2014 | Park et al. | G06F 21/36 715/863 |
| 2014/0298275 A1* | 10/2014 | Popov | G06F 3/04883 715/863 |
| 2014/0340323 A1* | 11/2014 | Jang | G06F 3/0416 345/173 |
| 2015/0123907 A1* | 5/2015 | Aoki | G06F 3/0416 345/168 |

* cited by examiner

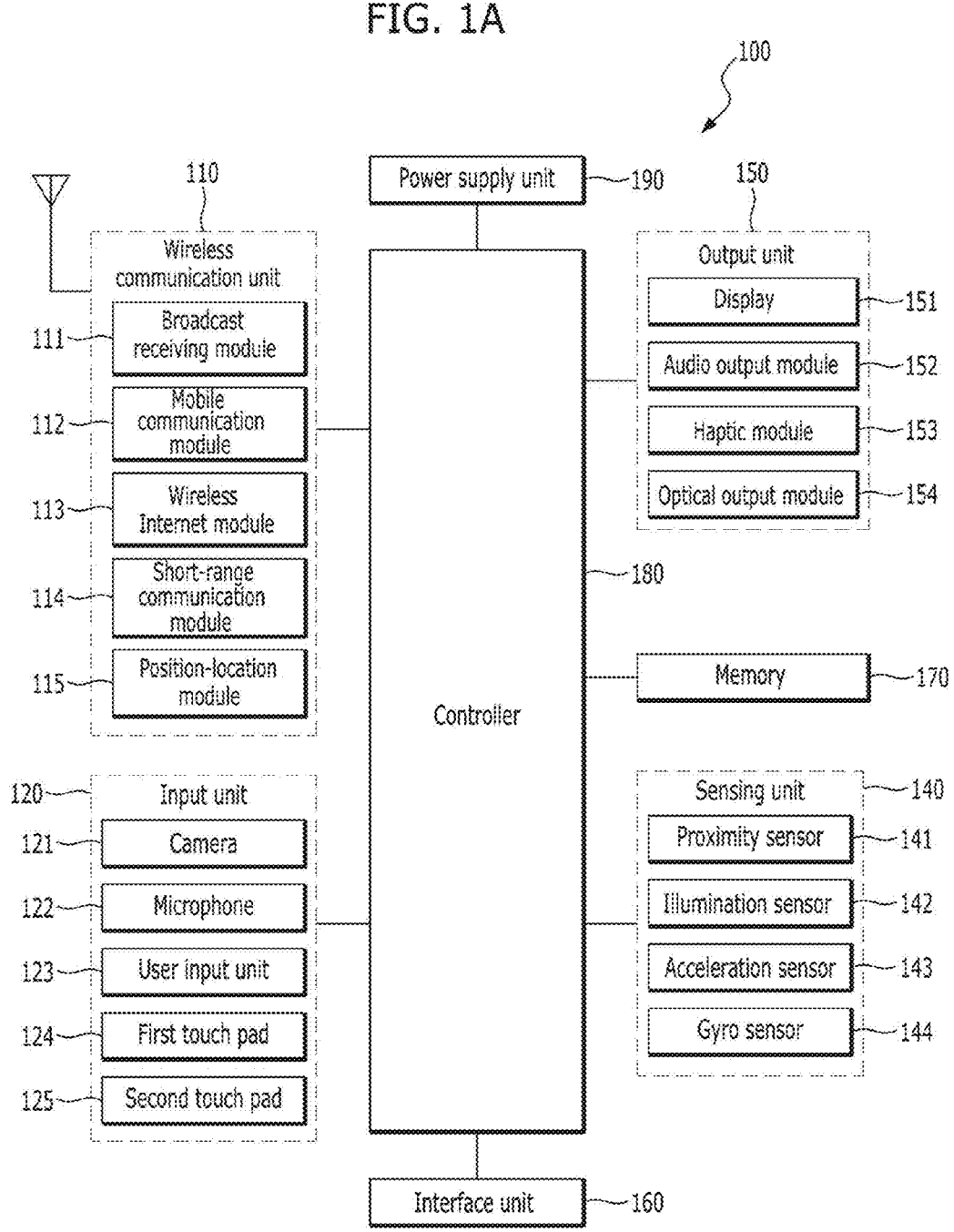

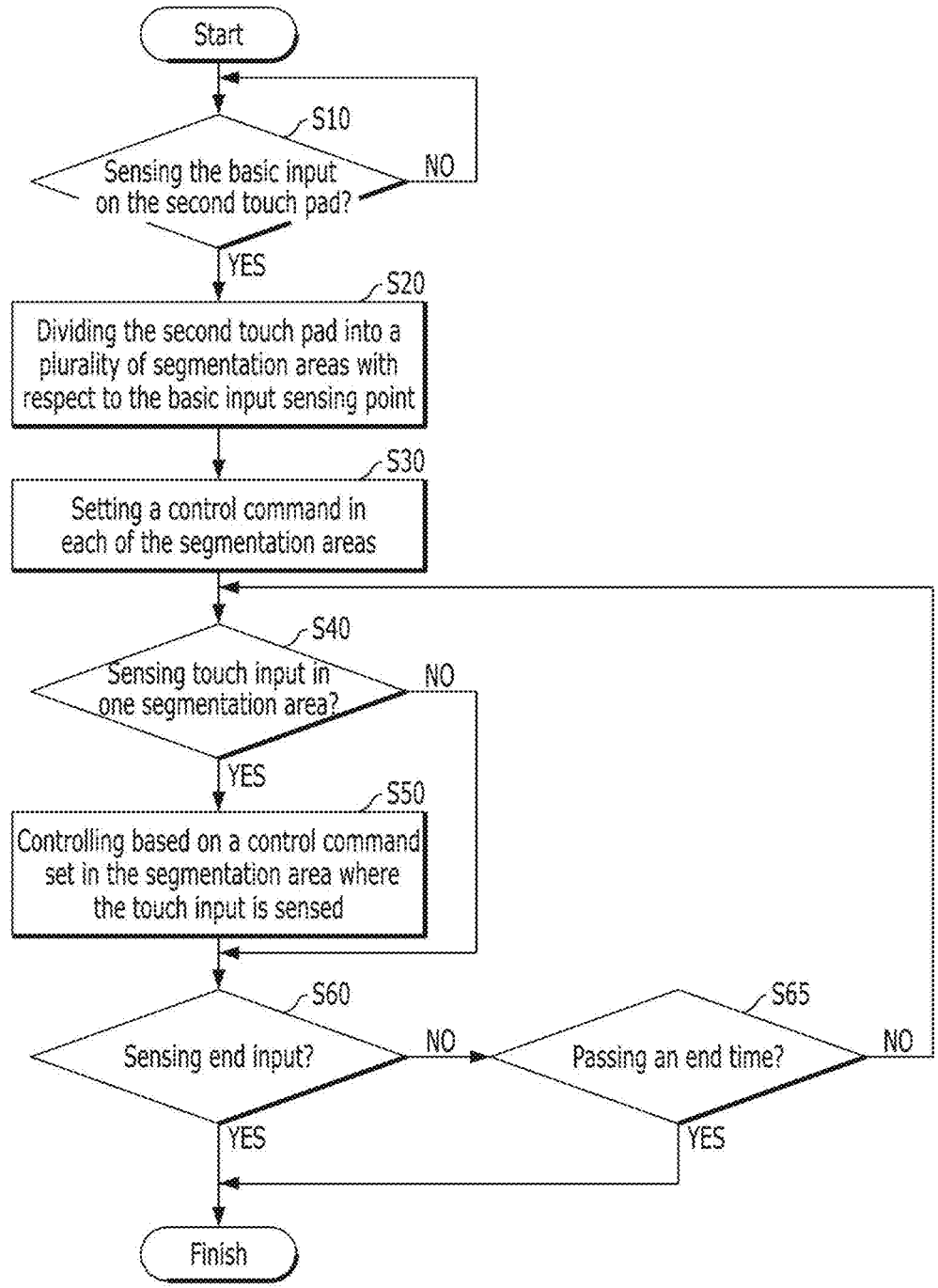

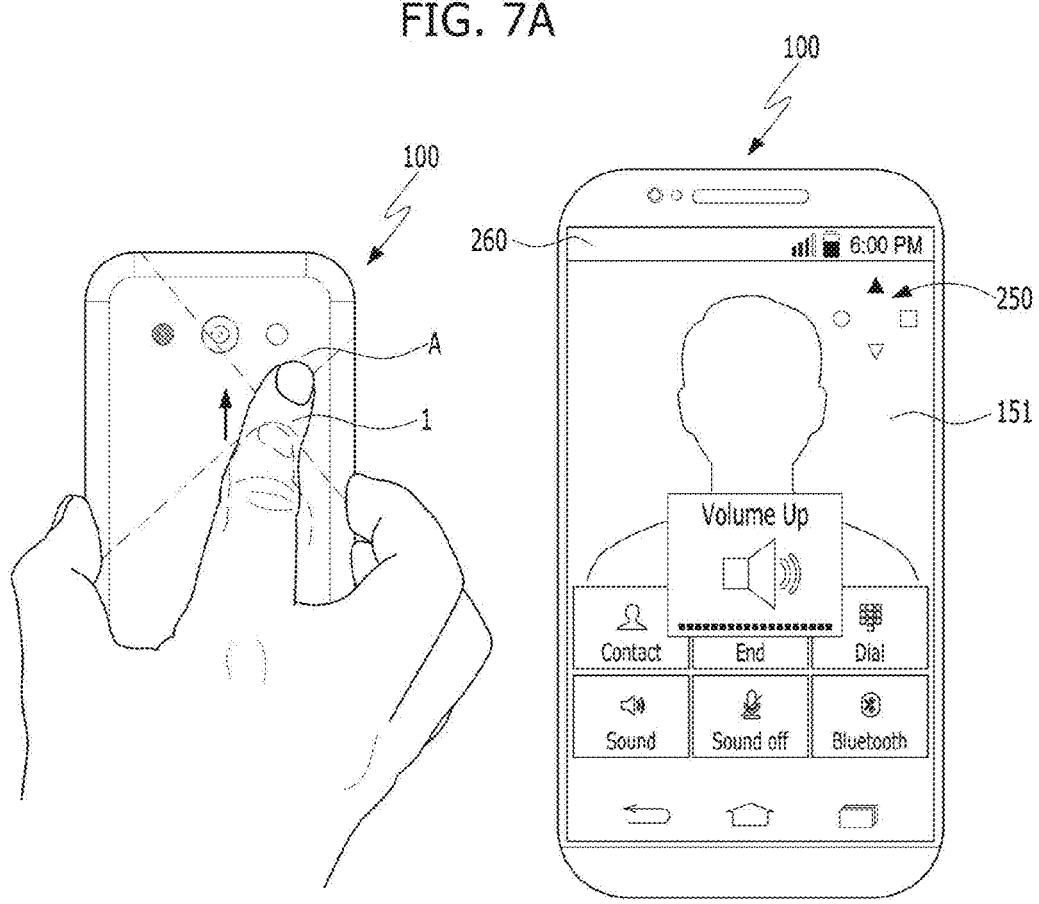

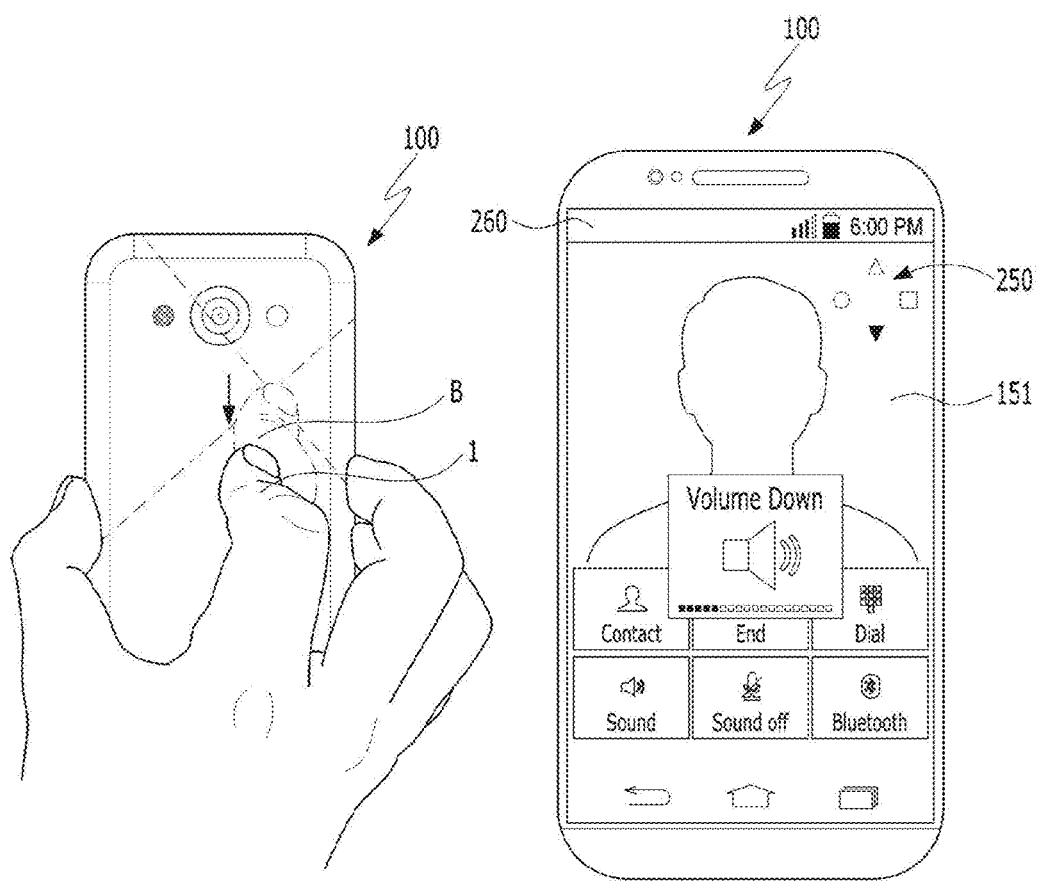

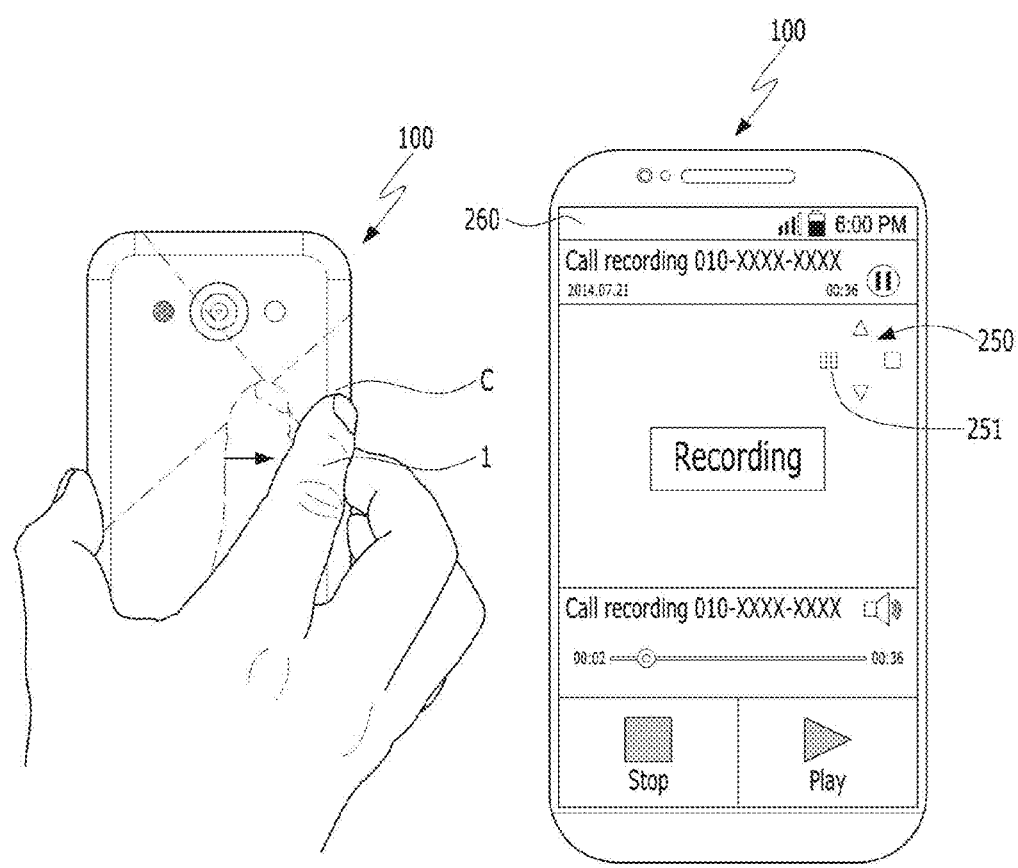

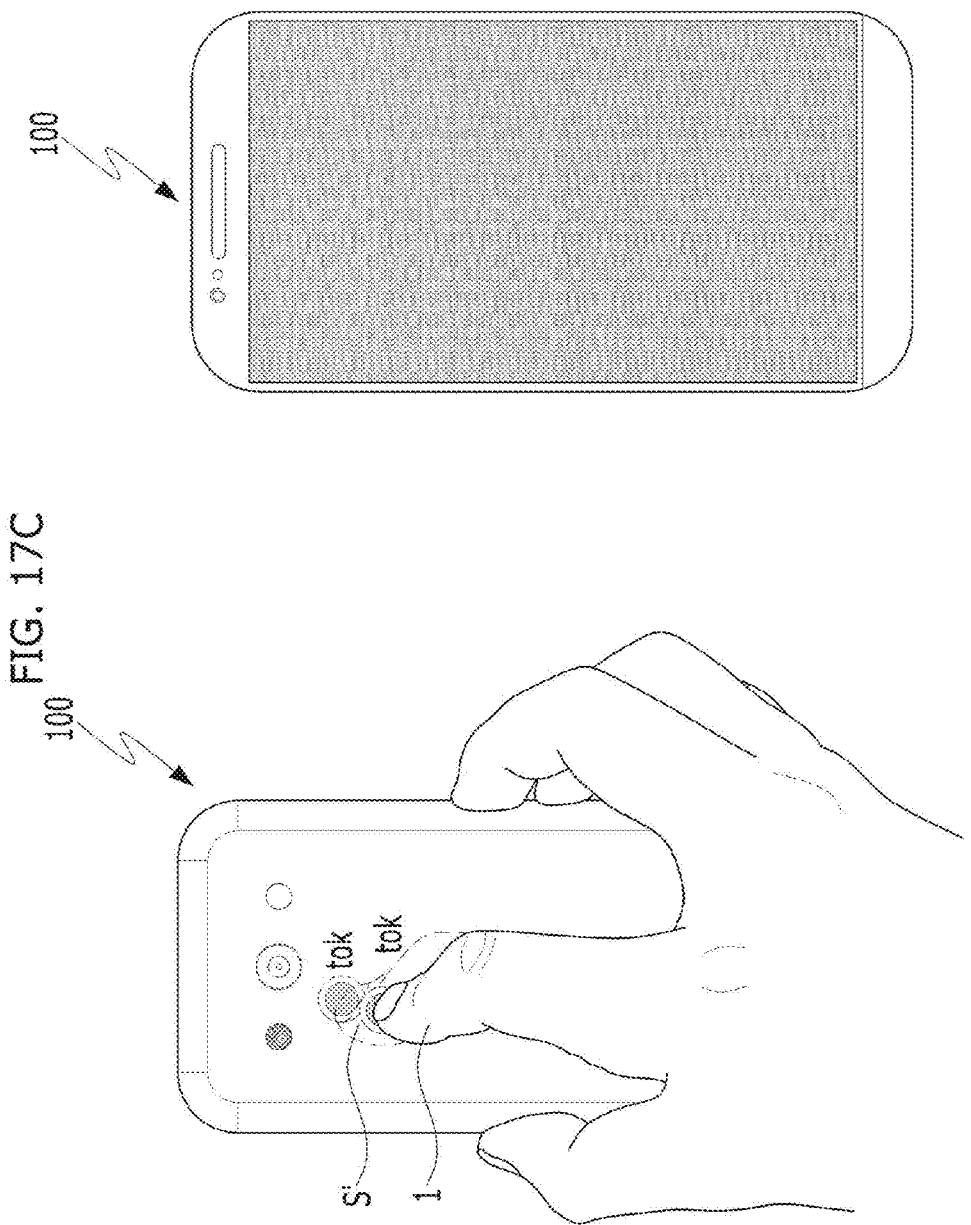

MOBILE TERMINAL SETTING FIRST AND SECOND CONTROL COMMANDS TO USER DIVIDED FIRST AND SECOND AREAS OF A BACKSIDE TOUCH SCREEN

CROSS-REFERENCE TO RELATED APPLICATIONS

Pursuant to 35 U.S.C. §119(a), this application claims the benefit of earlier filing date and right of priority to Korean Application No. 10-2014-0104892, filed on Aug. 13, 2014, the contents of which are hereby incorporated by reference herein in their entirety.

BACKGROUND OF THE INVENTION

1. Field of the Invention

Embodiments of the present disclosure relates to a mobile terminal including a touch sensor provided in a rear surface thereof.

2. Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With regarding the function of the multimedia player as important, a display provided in a front of a mobile terminal is getting larger and such a display has a touch pad to perform an input function simultaneously. As the display is getting larger, it is difficult to perform a touch input to a display provided in a front of a mobile terminal, using a hand holding the mobile terminal.

SUMMARY OF THE INVENTION

An object of the present disclosure is to provide a mobile terminal including a touch sensor provided in a rear surface thereof to enable a user's hand holding the mobile terminal to input touch for controlling the mobile terminal.

To achieve these objects and other advantages and in accordance with the purpose of the disclosure, as embodied and broadly described herein, a mobile terminal includes a mobile terminal includes a case having a front surface and a rear surface; a touch screen provided in the front surface of the case, the touch screen comprising a display unit for outputting image information and a first touch pad for sensing touch input; a second touch pad provided in the rear surface of the case for sensing touch input; and a controller controlling the display unit, the camera and a sound output unit, wherein, the controller configured to set a basic point on the second touch pad corresponding to a basic input sensed on the second touch pad, designate segmentation areas by dividing an area on the second touch pad with respect to the basic point, and set a control command for each of the basic input segmentation area, and control based on a first control commands set for a selected segmentation areas when touch input is sensed on the selected segmentation area.

The basic input may be a continuous touch input comprising touch input continuously performed several times or pattern touch input comprising touch input performed based on a preset shape, and basic point is an endpoint of the continuous touch input or the pattern touch input as the basic input.

The mobile terminal may further include a gyro-sensor for sensing motion of the case, wherein the basic input comprises a touch input sensed by the second touch pad and a motion of the case corresponding to a first motion pattern sensed by the gyro-sensor, the touch input and the motion sensed simultaneously, and the basic point is set a point of the touch input of the second touch pad.

The controller may cancel the designation of the segmentation area, when sensing the motion of the case as a motion pattern from the gyro-sensor. The controller may cancel the segmentation areas designated on the second touch pad, when a preset time period passes after sensing the basic input or when sensing end input. The controller may reset the segmentation areas based on a position of the touch input sensed in the selected segmentation area after sensing the touch input in the selected segmentation area.

The controller may cancel the designation of the segmentation areas on the second touch pad when sensing touch input in the selected segmentation areas, and the controller may set the first control command of the selected segmentation area on a whole area of the second touch pad, and the controller may control based on the first control command when touch input is sensed on the second touch pad. The controller may convert the control command designated in each segmentation area into a different control command when additionally sensing the basic input from the second touch pad after designation of the segmentation areas.

The controller may perform the first control command set in the selected segmentation area when sensing slide input which is continuous touch input to the selected segmentation area from the basic point. The controller may divide the segmentation areas at a uniform angle with respect to the basic point. The segmentation areas may include a first segmentation area located in a first direction from the basic point; and a second segmentation area located in the reverse of the first direction from the basic point.

The mobile terminal may further include an acceleration sensor for sensing the direction of gravity. The controller may divide the first segmentation area and the second segmentation area in a vertical direction with respect to the direction of gravity or in horizontal direction with respect to the direction of gravity. The controller may divide the first segmentation area and the second segmentation area in an upper and lower direction or a left and right direction with respect to a screen output on the display unit.

The segmentation areas may further include a third segmentation area located in a third direction rotated 90 degrees from the first direction along a clockwise direction; and a fourth segmentation area located in a fourth direction rotated 90 degrees from the second direction along a clockwise direction.

The controller may control the display unit to display an indicator which indicates the segmentation areas designated in the second touch pad and a control command set in the segmentation area on the front surface. The controller may set a plurality of control commands in one segmentation area by setting a different control command in the segmentation area based on the type of the touch input.

The type of the touch input may be at least one of tap input which touches the segmentation area one time, touch and drag input which moves slidingly to the segmentation area from the basic input point, and long touch input which keeps contact with the segmentation area for a preset time period or more. When a locked state where a function of the mobile terminal is limited, the basic input may be the touch input initially input to the first touch pad or the second touch pad.

The control command may release the locked state when touch input is sensed in the segmentation area in a preset order. The second touch pad may be located an upper portion of the rear surface of the mobile terminal. The mobile terminal may further include a LED matrix disposed an inner surface of the second touch pad, the LED matrix comprising a plurality of LEDs for emitting light, wherein the controller outputs a specific character, image and figure by controlling the LED matrix for the basic input.

In at least one embodiment of the mobile terminal in accordance with the present invention, the user may input the control command, with holding the mobile terminal in the hand, using the touch sensor provided in the rear surface.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 3 is a flow chart illustrating a method for controlling a mobile terminal, using a second touch panel provided in a rear surface of the mobile terminal in accordance with the present disclosure;

FIGS. 7A through 7D are diagrams illustrating a screen on a display unit based on selection of a segmentation area of the mobile terminal in accordance with the present disclosure;

FIG. 17A through FIG. 17C are diagrams illustrating a screen output on a display unit when a segmentation area of a second touch pad in accordance with the present disclosure is selected when display uniting a notification message window on a screen.

DESCRIPTION OF SPECIFIC EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
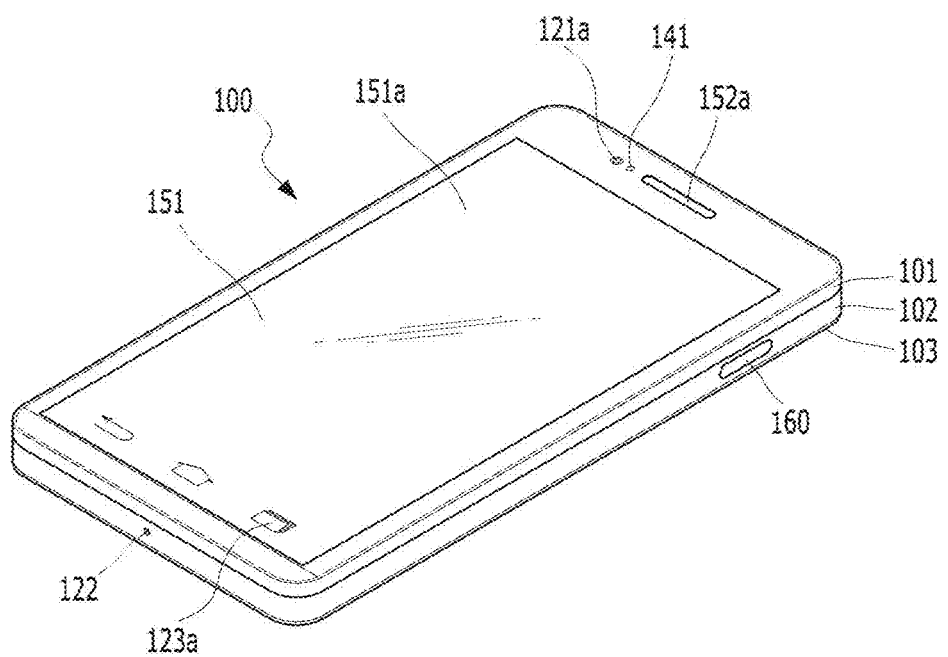
FIGS. 1B and 1C are conceptual views of one example of the mobile terminal, viewed from different directions.
Figure 1C:
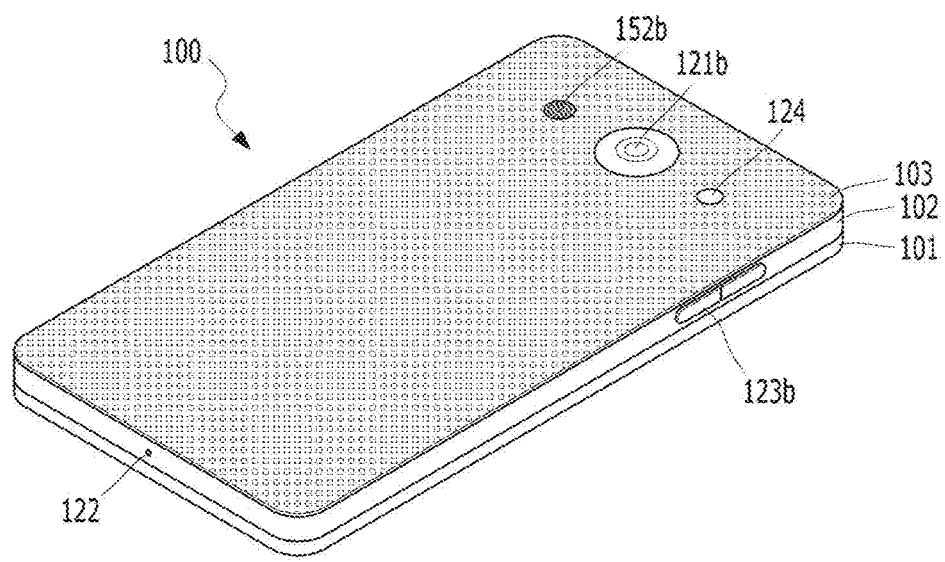

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152B.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

However, alternative arrangements are possible and within the teachings of the instant disclosure. Some components may be omitted or rearranged. For example, the first manipulation unit 123a may be located on another surface of the terminal body, and the second audio output module 152B may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152A may be implemented in the form of a speaker to output voice audio, alarm sounds, multimedia audio reproduction, and the like.

The window 151a of the display unit 151 will typically include an aperture to permit audio generated by the first audio output module 152A to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152a can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen The mobile terminal 100 in accordance with the present disclosure includes a touch pad 125 provided in a rear surface thereof. The rear surface of the mobile terminal may be the rear cover 103 for a battery detachable type mobile terminal or the rear case 102 for a battery integrated type mobile terminal. A touch pad is disposed in a case. Alternatively, the rear surface may be insert-injected to the rear case 102 or the rear cover 103 or directly patterned on the rear case 102 or the rear cover 103 as an integrated type.

To distinguish the touch pad disposed on the display unit 151 arranged in the front side, the touch pad disposed on the front side of the display unit may be a first touch pad 124 and the touch pad disposed on the rear surface of the terminal body may be a second touch pad 125.

Figure 2A:
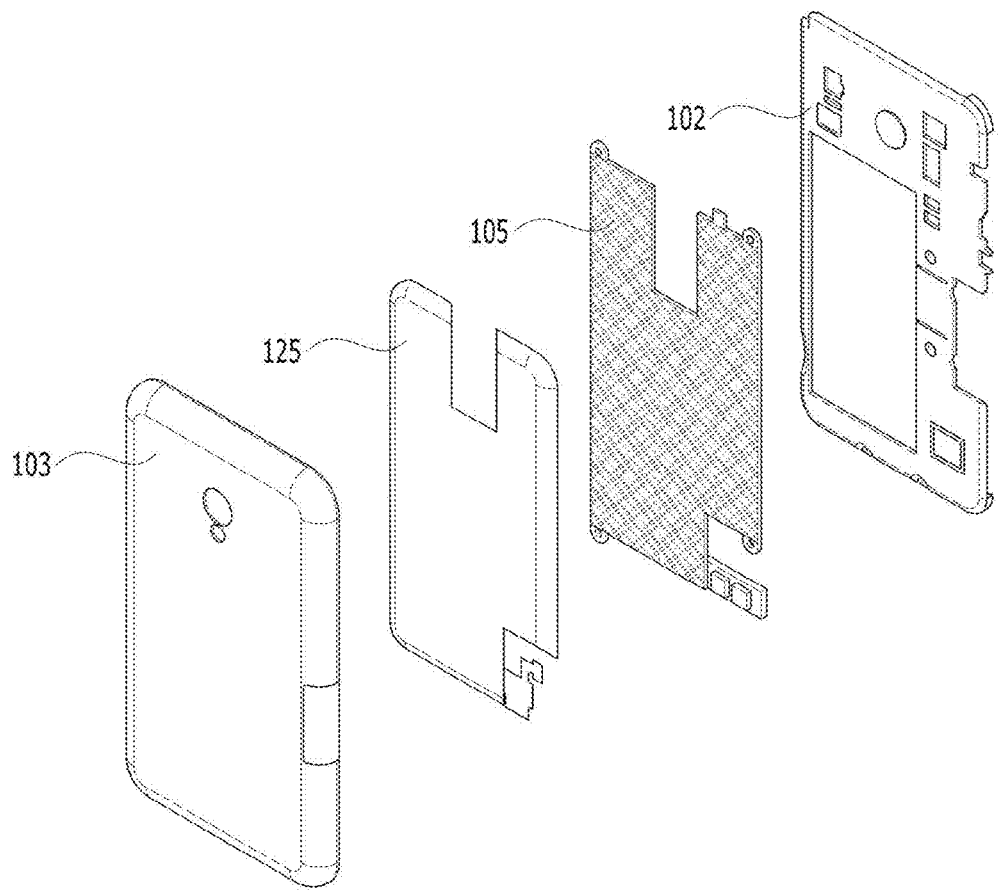
FIG. 2A is an exploded perspective diagram illustrating one example of a structure of a rear surface provided in the mobile terminal in accordance with the present disclosure.

FIG. 2A is an exploded perspective diagram illustrating one example of a structure of a rear surface provided in the mobile terminal in accordance with an embodiment of the present disclosure. As shown, the mobile terminal includes a second touch pad 125 provided in a rear surface thereof.

The second touch pad 125 may sense touch input to the rear surface of the mobile terminal and it may be disposed in the rear cover 103 or integrally formed with the rear cover 103. For the battery integrated type, the second touch pad may be formed in the rear case 102 as mentioned above. Hereinafter, the second touch pad 125 coupled to the battery cover will be described for explanation sake.

In the second touch pad 125, touch electrodes are formed, using ITO film. The second touch pad 125 senses a variation of capacity between touch electrodes and recognizes a user's touch input. It is difficult to locate the second touch pad in a portion of the rear surface where the camera or the speaker is provided, because a hole is formed in the rear case and the rear cover 103. As shown in FIG. 2A, the second touch pad 125 may be partially omitted.

The second touch pad 125 may be located only in an upper portion of the rear surface to sense a touch input generated in a portion held by the user. The second touch pad 125 needs to be electrically connected to the mobile terminal to be provided with the power and to transfer the sensed variation of the capacity to the controller 180 of the mobile terminal. When coupled to the rear case 102, the second touch pad 125 may be connected to the mobile terminal 100 via a main board and a flexible printed circuit board (FPCB). When coupled to the rear cover 103, the second touch pad 125 may be connected to the terminal body via a terminal inside the rear cover 103. The terminal is unloaded from the terminal body when the rear cover 103 is decoupled and electrically connected to the terminal body when the rear cover 103 is coupled, only to supply the power to the second touch pad 125 and to transfer the touch input sensed by the second touch pad 125 to the controller.

An LED matrix 105 may be further provided on the second touch pad 125. The LED matrix 105 has a plurality of light-emitting elements arranged in a grid. The power is selectively applied to the light-emitting elements and diverse images and characters are provided, such that various pieces of information can be provided through the rear surface. The LED matrix 105 may be an omitted portion for the speaker 152b, the camera 121b, like in the second touch pad 125.

The LED matrix 105 may be directly coupled to the rear case 102 or it may be coupled to the rear cover 103 to be connected to the terminal body by the terminal, together with the second touch pad 125. Accordingly, the LED matrix 105 may be provided with the power or a control signal of the light-emitting element to selectively switch on and off the light-emitting elements. To make the light emitted from the LED matrix 105 visible in the rear surface of the mobile terminal, the rear cover 103 may be formed of an opaque material. Using the opaque material, the light emitted from the light-emitting elements of the matrix 105 may be spread delicately to provide a classy image.

Figure 2B:
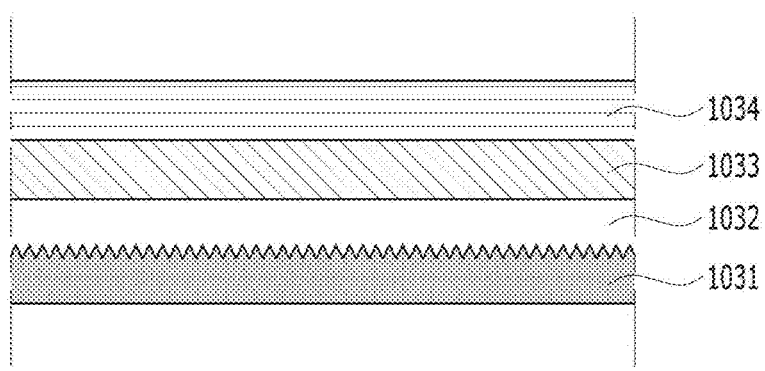
FIG. 2B is a sectional diagram illustrating one example of a battery cover provided in the mobile terminal in accordance with the present disclosure.

FIG. 2B is a sectional diagram illustrating one example of a battery cover provided in the mobile terminal in accordance with the present disclosure. In FIG. 2B, a layer structure is shown which constitutes of an injection-molding 1031, a primer layer 1032, a color layer 1033 and a top coat layer 1034 to realize the opaque material on the rear cover 103.

The injection molding 1031 is injected-molded, using a transparent or colored resin, and forms a basic profile of the rear cover 103. A pattern may be realized on a surface of the injection molding 1031 to reflect the light diffusedly and to spread the light softly. The primer layer 1032 may be coated on an uneven surface of the injection molding 1031 not to make the uneven surface visible outside or by the user directly. The color layer 1033 may be coated on the primer layer. When the injection molding has a color, the color layer may be omitted or pigment having pearl may be coated as the color layer. The top coat layer 1034 blocks ultraviolet rays and increases the strength of the rear cover 103 to protect the rear cover 103 from breakage or cracks.

The light may be softly emitted through the opaque injection molding 1031 having the uneven surface the coating layers 1032, 1033 and 1034 may be layered on the opaque injection molding 1031, such that the rear case 103 having a smooth and solid surface may be provided.

Next, FIG. 3 is a flow chart illustrating a method for controlling a mobile terminal, using a second touch panel 125 provided in a rear surface of the mobile terminal in accordance with the present disclosure. As a second touch pad 125 is provided in the rear surface of the mobile terminal, touch input may be sensed. At this time, the user is holding the mobile terminal. Even when variation of the capacity is sensed in the rear surface, it is difficult to identify whether the capacity variation is generated by the user's command input or the user's simple holding of the rear surface.

Accordingly, once a basic input for sensing a signal to the controller to recognize the basic input is different from the input generated by the user's holding of the mobile terminal is sensed by the second touch pad 125 (S10), the area of the second touch pad 125 is divided into segmentation areas with respect to a point where the basic input is sensed (hereinafter, a segmentation reference point(S)) (S20). The basic input may be a preset patterned touch input or a motion pattern for moving the mobile terminal 100.

A control command is set for each of the segmentation areas (S30). When a touch input is sensed in one of the segmentation areas (a first segmentation area) (S40), the controller 180 controls the mobile terminal 100 in accordance with a first control command set for the first segmentation area. Until an end input for releasing the segmentation areas is sensed (S60) or a preset end time passes (S65) when the user tries to end a control command input using the second touch pad 125, the user may control the mobile terminal, using the second touch pad 125. The end input may be a touch input having a preset pattern or a motion pattern for moving the mobile terminal 100, which is distinguished from the basic input.

Figure 4:
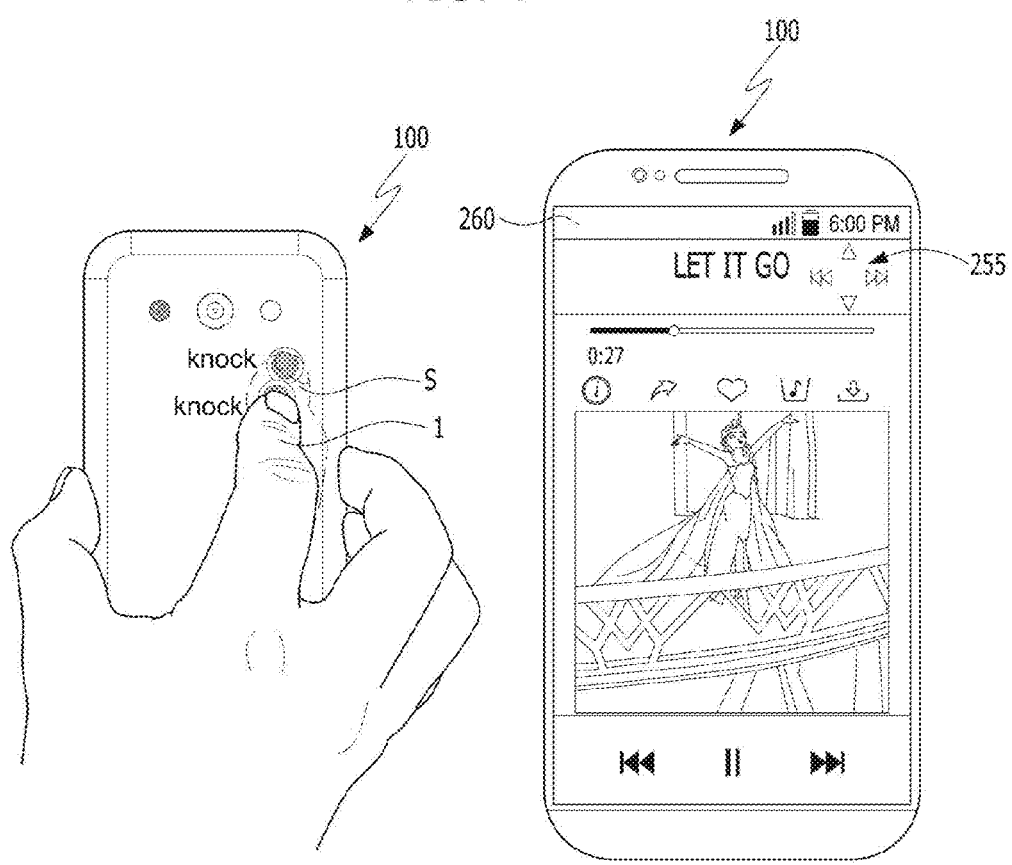
FIG. 4 is a diagram illustrating one embodiment of a base input setting for the mobile terminal in accordance with the present disclosure.

Referring to following drawings, each of the steps will be described in detail. FIG. 4 is a diagram illustrating one embodiment of a basic input setting for the mobile terminal in accordance with the present disclosure. Once a basic input for sensing a signal to the controller to recognize the basic input is different from the input generated by the user's holding of the mobile terminal is sensed by the second touch pad 125 (S10 in FIG. 3), the controller 180 prepares to control the mobile terminal, using the second touch pad 125. The basic input is recognized when a touch input having a specific pattern is sensed to distinguish it from the capacity variation of the second touch pad 125 recognized by the user's holding of the mobile terminal.

Examples of the basic input include a continuous touch input configured of continuous several short touch inputs, a touch-and-drag input having a specific pattern (e.g., L or S pattern) and a swipe operation for rubbing the second touch pad 125 several times. The user may input the basic input while looking at the display unit 151 of the front side, and not looking at the rear surface. Alternatively, a point having the last touch input of the continuous input or touch-and-drag input may be set as the segmentation reference point (S).

When an acceleration sensor 143 or a gyro-sensor 144 senses that the mobile terminal 100 is moved in accordance with a preset type (a motion pattern), with sensing a new touch input, the new touch input point may be set as the segmentation reference point (S). Once the segmentation reference point (S) is set, touch inputs sensed for a preset time period after the setting of the segmentation reference point (S) may be recognized as a user's control command and segmentation areas having control commands set, respectively, are designated in relative positions (S20 in FIG. 3).

When the second touch pad 125 sets a control command in a segmentation area to operate as the user input unit when recognizing the input which is not the basic input as the basic input, the second touch pad 125 is controlled different from the user's intention. Accordingly, a second touch pad activating icon 255 may be output to select whether to input a command through a segmentation area of the second touch pad 125. The input of the control command through the second touch pad 125 may be determined based on the selection of the second touch pad activating icon 255. Alternatively, the user may select the input of the control command, using diverse methods including mobile terminal shaking, a voice command and so on.

Figure 5:
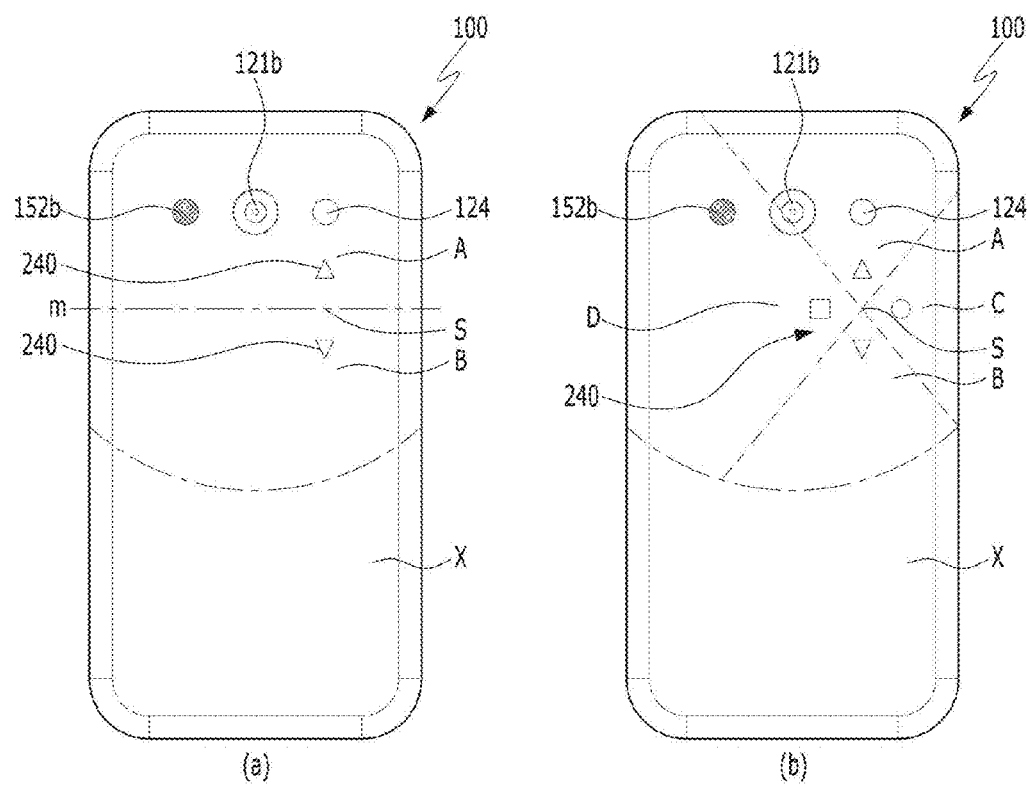
FIG. 5 is a diagram illustrating a base input of the mobile terminal in accordance with the present disclosure.

FIG. 5 is a diagram illustrating a designating mechanism of a segmentation area. FIG. 5 (a) illustrates one embodiment showing two segmentation areas and FIG. 5 (b) illustrates one embodiment showing four segmentation areas. The controller 180 divides the second touch pad 125 at a preset angle from a segmentation reference point (S) into a plurality of segmentation areas.

When two segmentation areas are designated as shown in FIG. 5 (a), the second touch pad area may be divided into a left segmentation area (A) located in a first direction and a right segmentation area (B) located in a second direction. In the drawing, the left segmentation area and the right segmentation area are divided into an upper segmentation area (A) and a lower segmentation area (B) with respect to a horizontal division line (m) passing the segmentation reference point (S). Alternatively, the area may be divided into the left segmentation area and the right segmentation area.

The segmentation areas may be designated based on the direction of gravity. The direction of gravity is sensed, using the acceleration sensor 143 and the second touch pad area may be divided into segmentation areas with respect to a division line extended in parallel with or perpendicular to the direction of gravity.

When designating four segmentation areas shown in FIG. 5 (b), there may be further a third segmentation area located in a third direction rotated 90 degrees from the first direction along a clockwise direction and a fourth segmentation area located in a fourth direction rotated 90 degrees from the second direction along a clockwise direction. When the second touch pad area is divided into 4 segmentation areas, upper, lower, left and right portions are designated as the four segmentation areas. Functions performed by the segmentation areas may be set variously based on the type of the executed application or a state of the mobile terminal.

At this time, the second touch pad 125 may be partially omitted in the portion of the mobile terminal 100 held by the user to support the mobile terminal 100 or the portion already touched by the user is not recognized as the touch input for inputting the control command but ignored (in other words, inactivation of touch input). Inactivation has to be performed even to a portion farther than the touched portion. After that, even when the capacity variation of the second touch pad 125 is sensed by the other fingers moving together one finger 1 moving to input a control command, such the capacity variation of the second touch pad 125 may not be recognized as the touch input for inputting the control command.

The portion (X) where the basic input is sensed is excluded from the second touch pad 125 where it is recognized that the contact for inactivating the touch input is sensed. A greater number of segmentation areas may be designated in a diagonal direction as well as the upper, lower, left and right segmentation areas. For explanation sake, four upper, lower, left and right segmentation areas (A, B, C and D) will be described.

Once a segmentation reference point (S) is set, an icon for showing a segmentation area (A, B, C and D) where a control command corresponding to an executed application is set may be displayed on the rear surface. As the rear surface has the LED matrix 105, the controller may output the icon to a portion corresponding to the segmentation area (A, B, C and D) with respect to the segmentation reference point (S).

When the user is talking on the phone, an icon 240 corresponding to the designated segmentation areas (A, B, C and D) may be displayed on the rear surface of the mobile terminal. Upper and lower segmentation areas (A and B) adjust a call volume and an arrow icon (Δ ∇) is displayed. On a left segmentation area (C) is displayed an icon (○) meaning a recording function and on a right segmentation area (D) is displayed an icon (□) meaning stop of the recording. A color or size of the icon (Δ) corresponding to the selected segmentation area (A) may be differentiated from the other icons to be distinguishably displayed.

Figure 6:
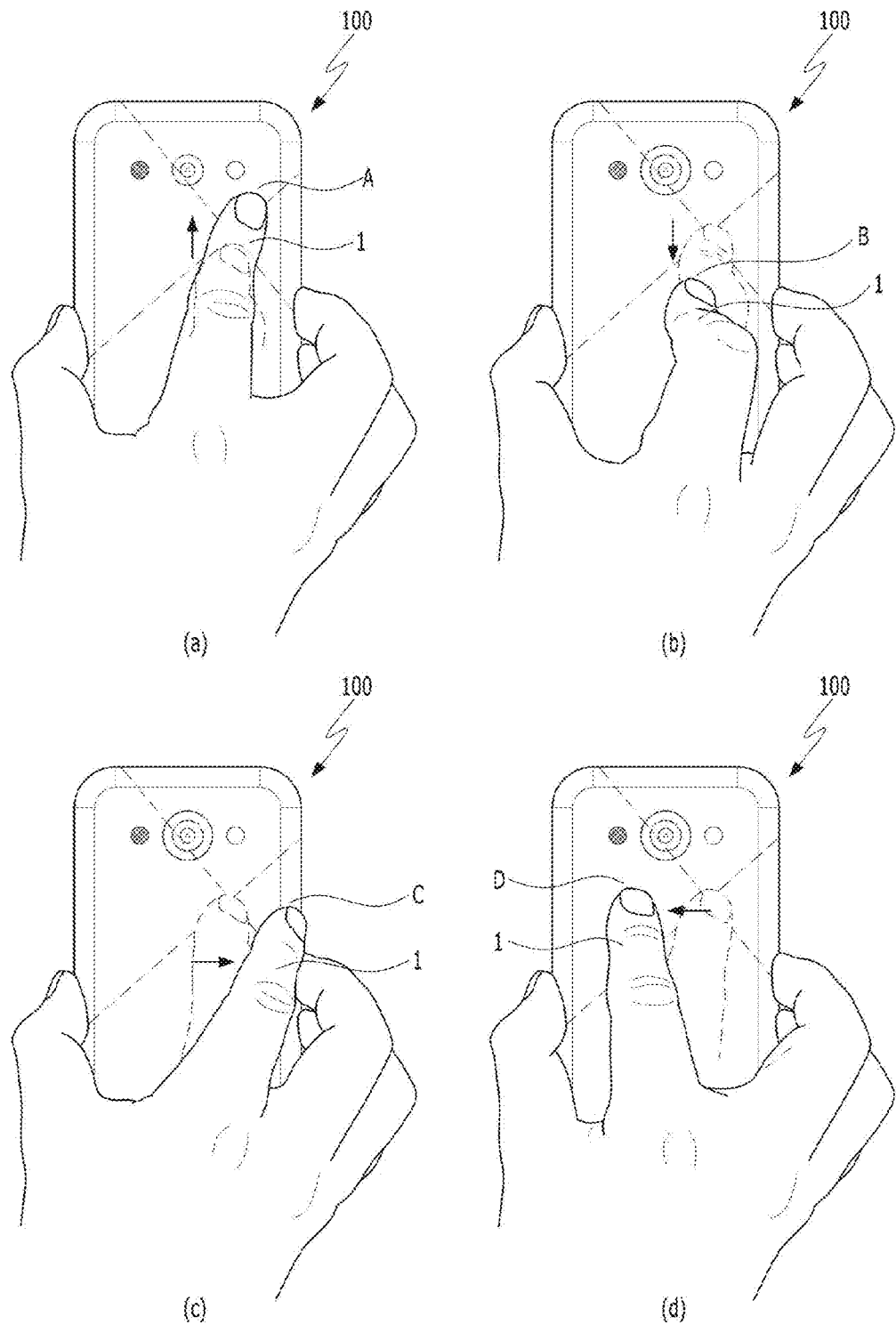
FIG. 6 is a diagram illustrating one embodiment of a method for selecting a segmentation area of the mobile terminal in accordance with the present disclosure.

Referring to FIGS. 6a through 6c, the user touches four segmentation areas (A, B, C and D). When holding the mobile terminal 100, the user moves the index finger (or another finger) and selects a segmentation area. It is shown that the user touches segmentation areas (A, B, C and D) where different control commands are designated in an upper portion (see FIG. 6a), a lower portion (see FIG. 6b), a left portion (see FIG. 6c) and a right portion (see FIG. 6d), respectively. Referring to FIG. 6c, the user is moving, with looking at the display unit 151 in a state of moving the user's finger 1 in the drawing. In the user's view, the user recognizes to move the finger in a left direction and it will be described that the user moves the finger to the left portion in the left direction.

The user takes the finger 1 off the segmentation reference point (S) and moves it to each of the segmentation areas (A, B, C and D) to perform touch input by contacting the finger 1 on the second touch pad 124. Or, the user slidingly moves (touches and drags) the finger to each of the segmentation areas (A, B, C and D) from the segmentation reference point (S) to select one of the segmentation areas (A, B, C and D).

FIGS. 7A through 7D are diagrams illustrating a screen of a first embodiment of an application performed when a touch input is sensed in segmentation areas (A, B, C and D) of the mobile in accordance with the present disclosure. The segmentation areas are divided and a control command is assigned to each of the segmentation areas based on an executed function or application. To display the assigned control command and to notify the user how the segmentation areas are divided, an indicator 250 may be displayed on the display unit 151 of the front surface shown in FIG. 7A. The indicator 250 may have a preset shape equal to a shape of the second touch pad activating icon 255 mentioned above.

Figure 7D:
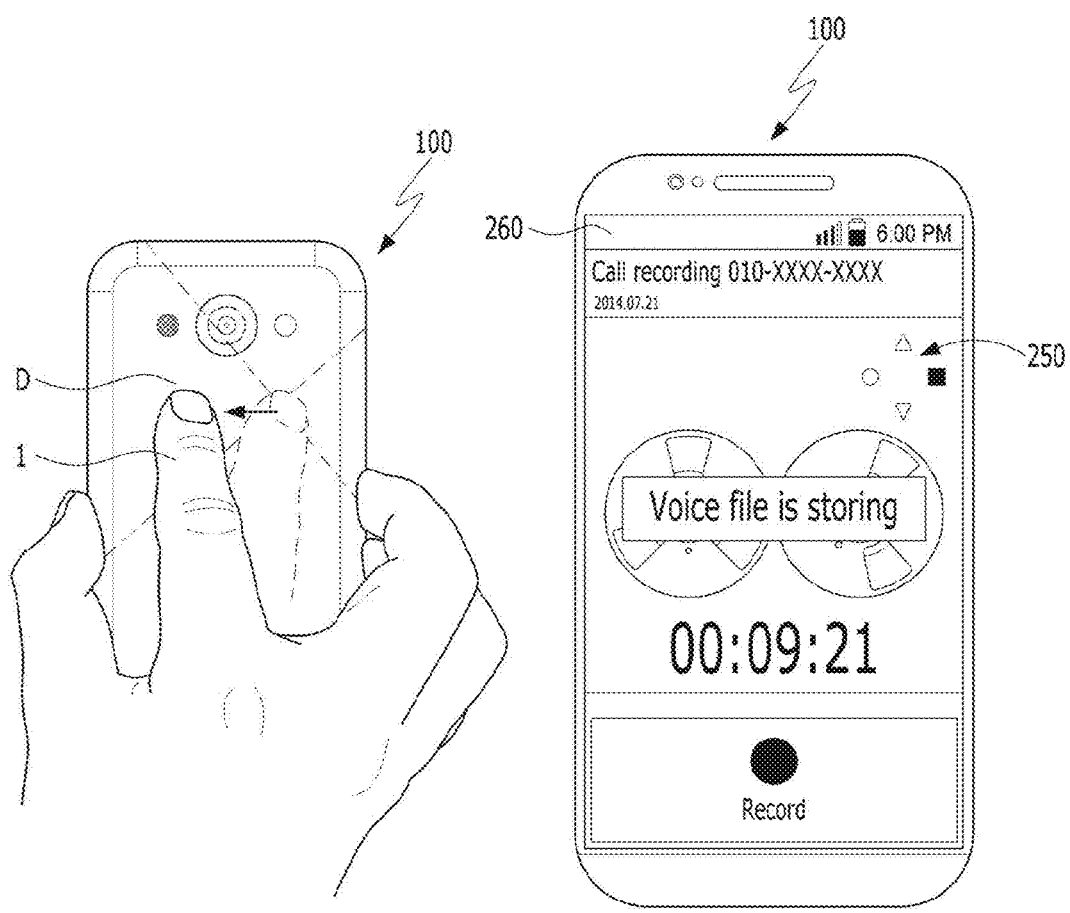

When the user selects an upper or lower segmentation area (A and B) by moving the finger 1, a call volume is adjusted as shown in FIGS. 7A and 7B. Alternatively, when the user selects a left segmentation (C) by moving the finger 1, a call conversation is recorded as shown in FIG. 7C. When the right segmentation area (D) is selected, the recording is ended as shown in FIG. 7D and the recorded file is stored. In this instance, the functions of the left segmentation area (C) and the right segmentation area (D) may be set in the reverse.

When the recording function is performed by selecting the left segmentation area (C) as shown in FIG. 7C, a control command for performing a recording need not be input again and another control command may be designated in the left segmentation area (C). In this embodiment, a control command for pausing the recording may be designated and an icon 251 displaying a control command corresponding to the left segmentation area (C) may be changed in the indicator 250 displayed on the display unit 151.

FIGS. 8A through 8E are flow charts based on selection of a segmentation area and diagrams of a screen on a display unit of the mobile terminal in accordance with the present disclosure. In the drawings, music is played and a video file can be also played. In this embodiment, when one segmentation area (a first segmentation area) is selected (S40), the segmentation area is controlled based on a control command designated in the corresponding segmentation area (the first segmentation area) (S50) and segmentation areas are divided in the second touch pad 125 at the same time. A control command is re-designated in each of the segmentation areas (S70). When the segmentation areas are re-set, it means that the segmentation areas are re-set to input a less number of control commands than the number of the initially set control commands so as to leave only functions of some of the segmentation areas.

For example, when four segmentation areas are divided initially, the segmentation areas may be re-set to allow only a control command of a segmentation area mostly related with a control command of the selected segmentation area to be input through the second touch pad 125 or only a control command of the selected segmentation area to be input through the second touch pad 125.

Figure 8A:
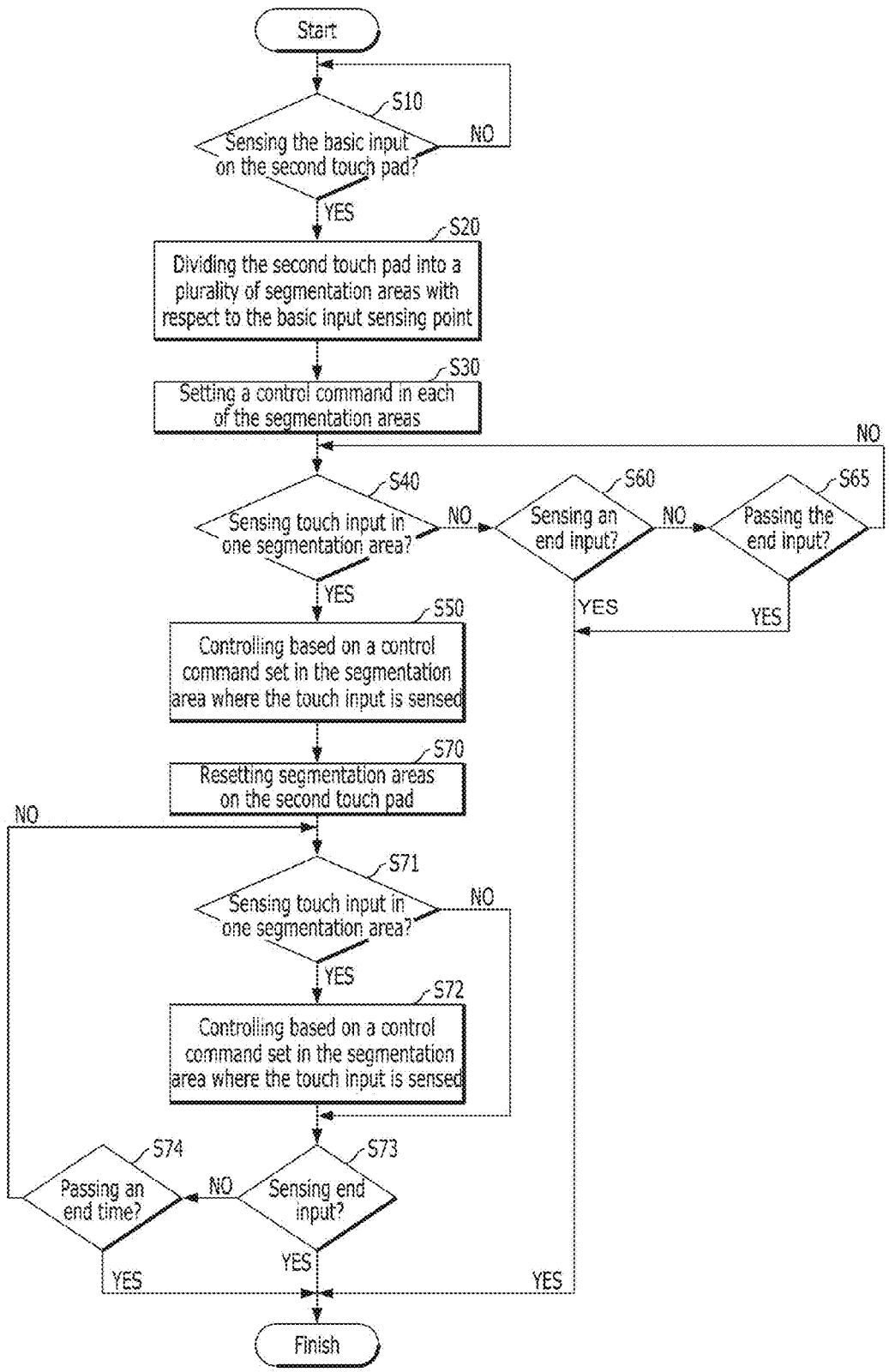
FIGS. 8A through 8E are flow charts based on selection of a segmentation area and diagrams of a screen on a display unit of the mobile terminal in accordance with the present disclosure.
Figure 8B:
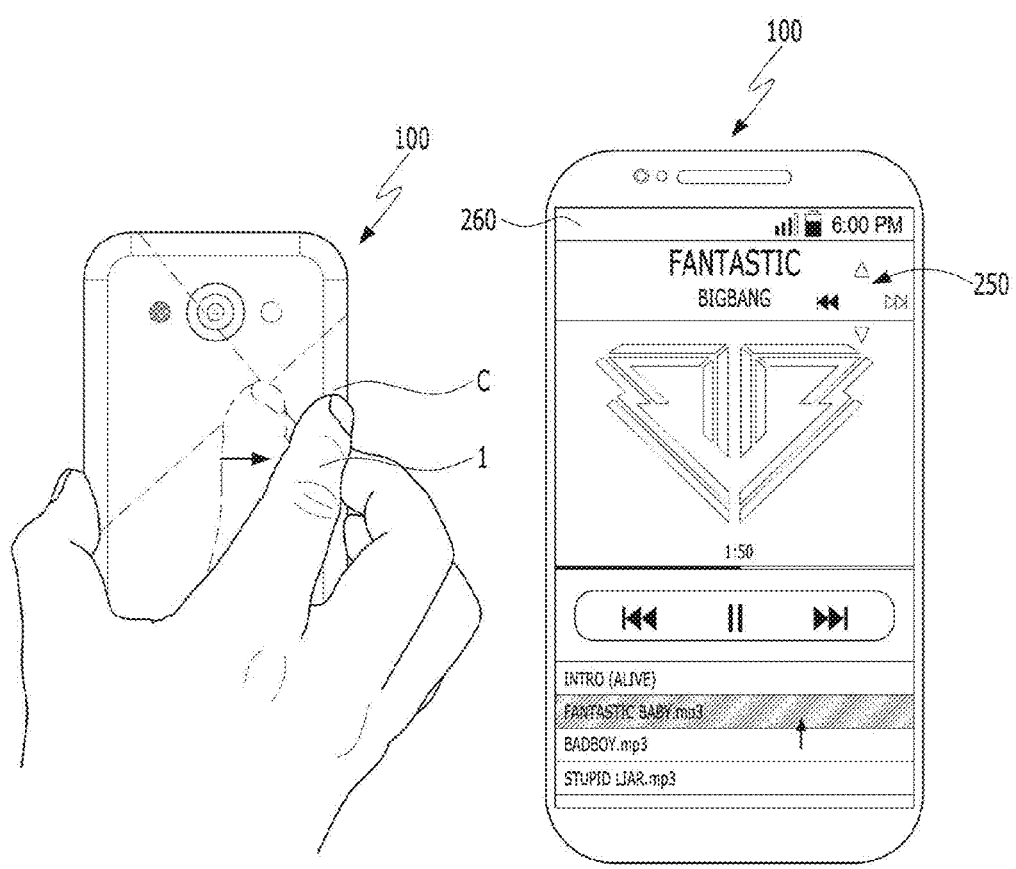

Even in this embodiment like the above embodiment, sound is output through the audio output unit 152. Accordingly, when the upper segmentation area (A) and the lower segmentation area (B) are selected, sound may be adjusted. When the left segmentation area (C) is selected, the former playing music may be played as shown in FIG. 8B. At this time, only a segmentation area (D) for a relative function to the selected segmentation area (C) is left and the other segmentation areas (A and B) may be canceled. After the user selects the left segmentation area (C) to play the former music as shown in FIG. 8B, only the left segmentation area (C) and the right segmentation area (D) for selecting the former music and the next music are divided. The designation of the upper segmentation area (A) and the lower segmentation area (D) may be canceled, to be dividedly assigned to the left segmentation area (C) and the right segmentation area (D) (S70).

Figure 8C:
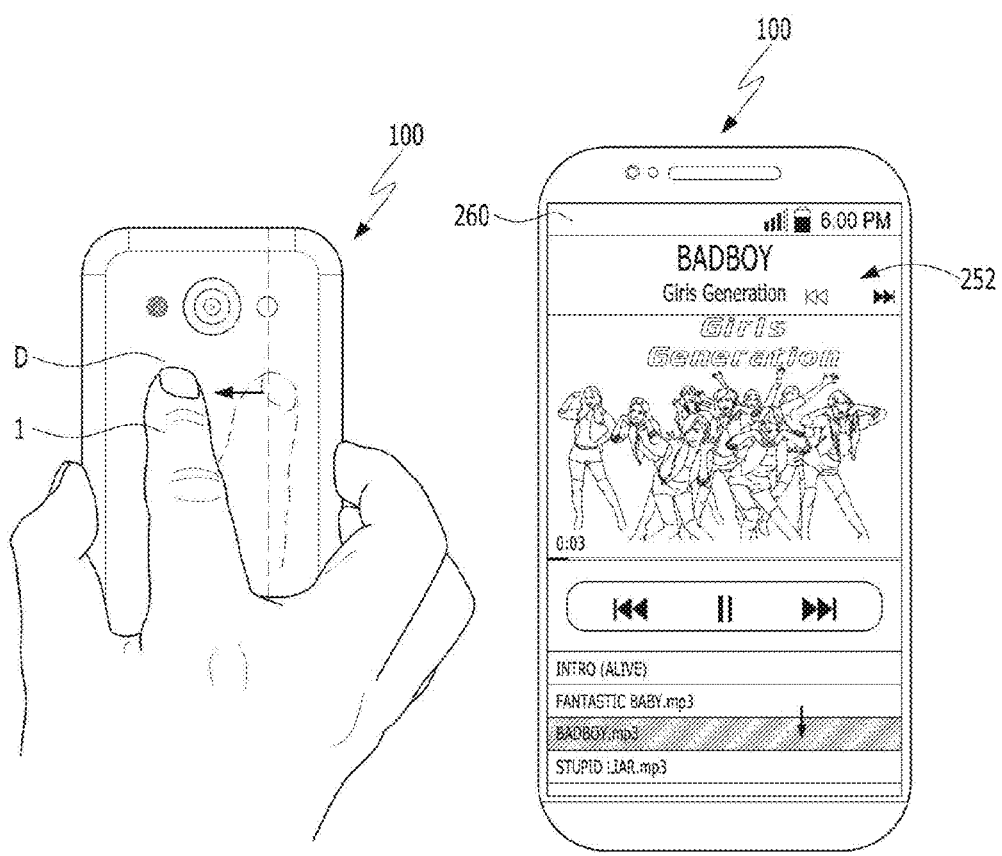

When the segmentation areas are changed as shown in FIG. 8C, an icon corresponding to a control command of the canceled segmentation area disappears and only an icon corresponding to a control command of the remaining segmentation area is left in the indicator 252 displayed on the front surface. When one (a second segmentation area) is selected from the re-set segmentation areas (S71), the terminal may be controlled based on a re-set control command (a second control command) (S72).

Figure 8D:
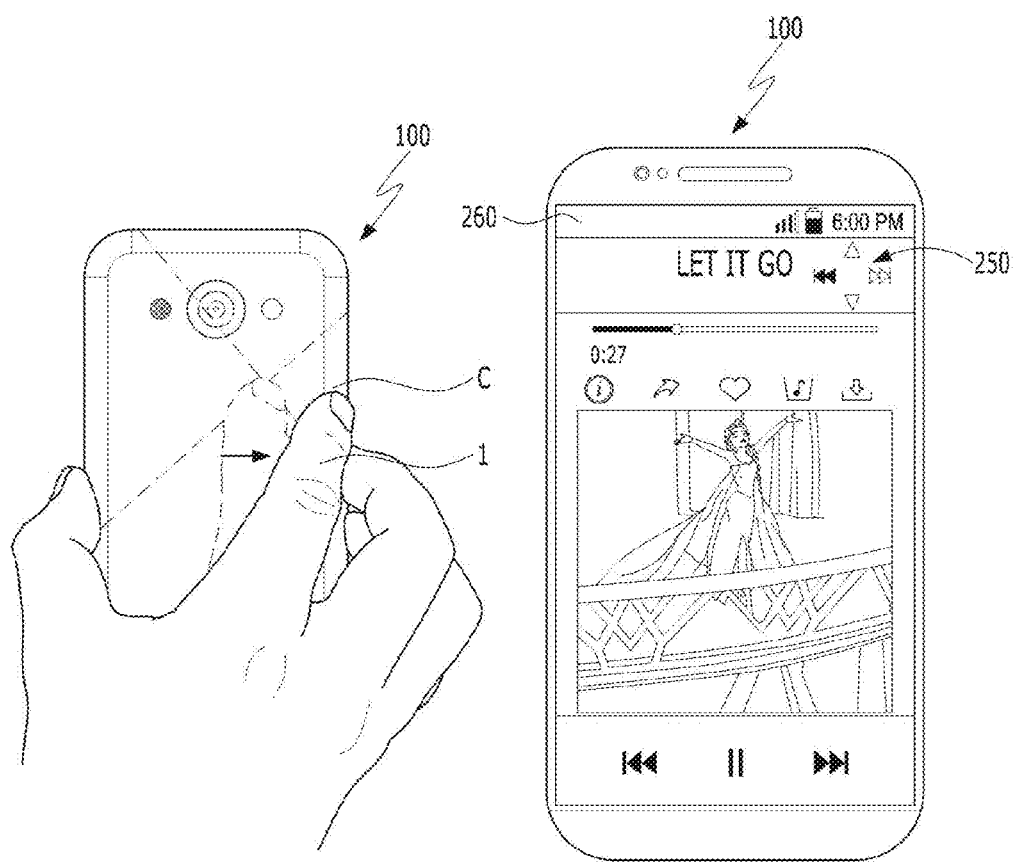
Figure 8E:
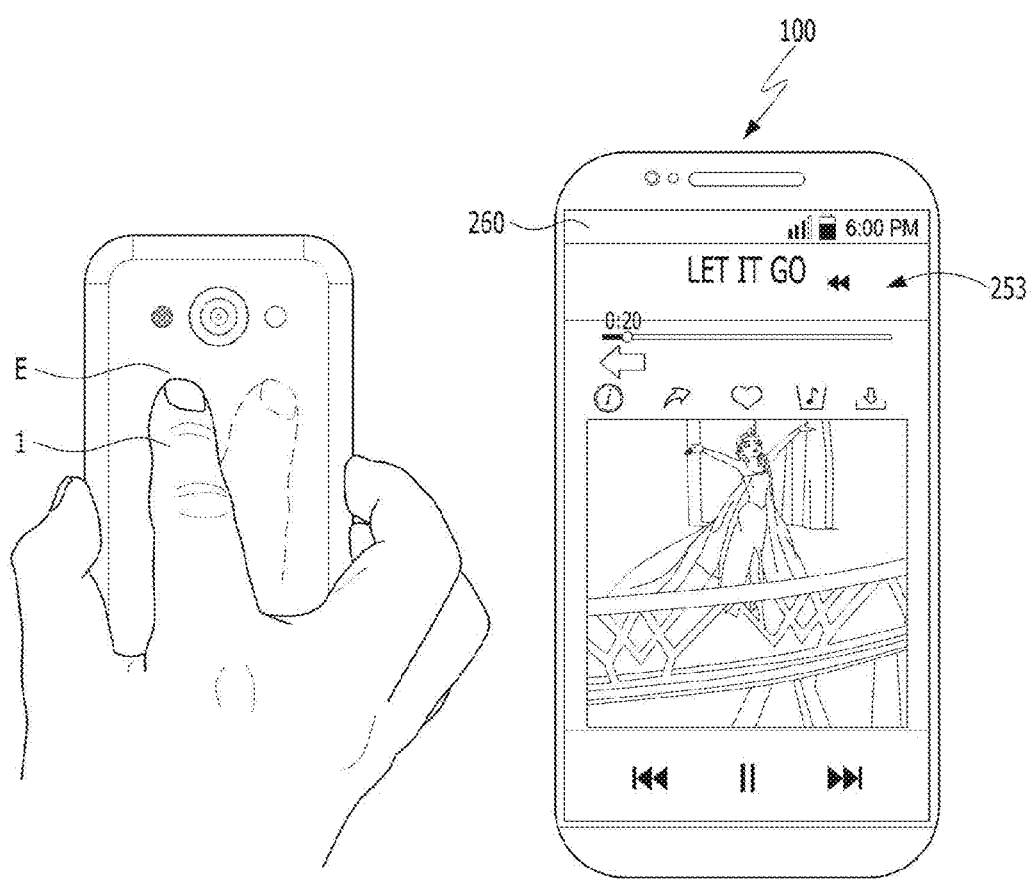

As shown in FIGS. 8D and 8E, a control command for playing the former play section is designated in the left segmentation area (C) and a control command for playing the next play section is designated in the right segmentation area (D). Control commands for adjusting a sound volume are designated in the upper segmentation area (A) and the lower segmentation area (B). In this instance, the plurality of the segmentation areas (A, B, C and D) are canceled and a control command of the selected segmentation area (C) is set for an entire area (E) of the second touch pad 125 (S70).

When touch input is sensed from the entire area (E, a second control area) of the second touch pad 125, a first control command is executed. In this instance, only a display corresponding to one control command is left even in the indicator 253. Even if any areas of the second touch pad 125 are touched, the same control command may be input. The portion (X) contacted by the user to support the mobile terminal as mentioned above may maintain the inactivated state as it is. Until an end input is sensed or an end time passes in accordance with the reset segmentation area, the mobile terminal may be controlled, using the second touch pad 125 (S73 and S74).

Figure 9:
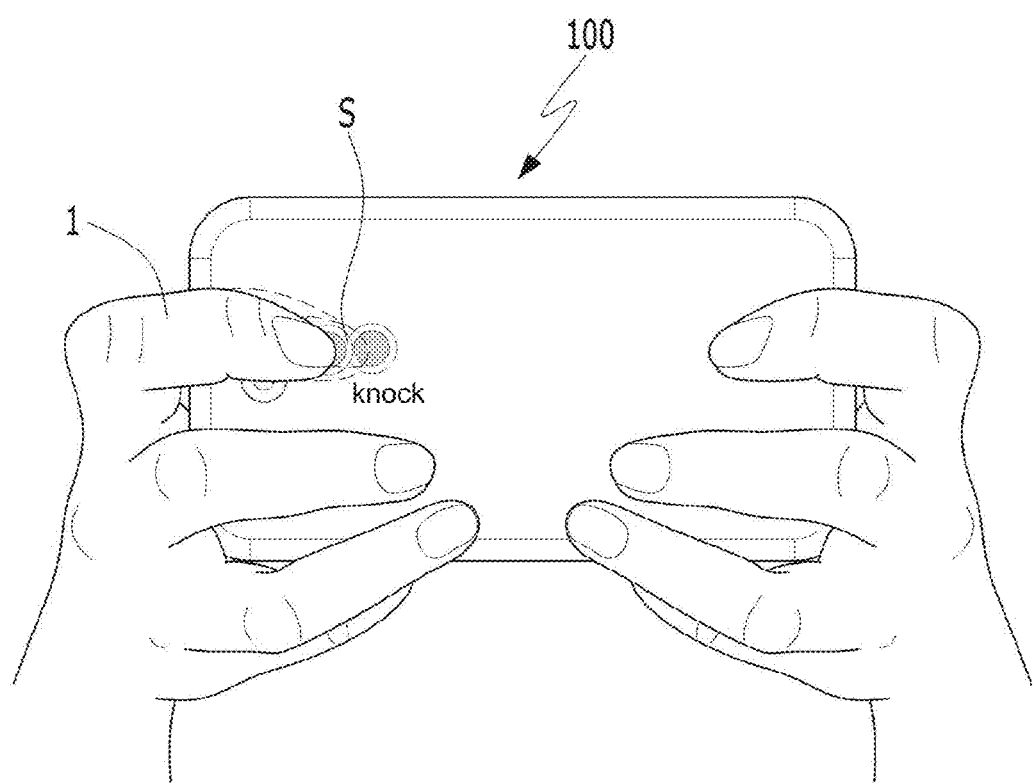
FIG. 9 is a diagram illustrating another embodiment of a base input setting for the mobile terminal in accordance with the present disclosure.

FIG. 9 is a diagram illustrating another embodiment for setting the segmentation reference point (S) in accordance with the present disclosure. When playing a game or a video file, the user can hold the mobile terminal along with the width. In this instance, the portion contacted by the user's finger 1 is different from the portion contacted by the user's finger 1 when using the mobile terminal vertically, such that the position of the segmentation reference point (S) may be different. As shown in FIG. 9, when a touch input is sensed to set the segmentation reference point (S) in the rear surface while holding the mobile terminal horizontally, the sensed point may be set as the segmentation reference point (S) and segmentation areas (A, B, C and D) are set in upper, lower, left and right directions with respect to the segmentation reference point (S).

At this time, to sense the up-and-down direction, the direction of gravity with respect to the mobile terminal may be sensed, using the acceleration sensor 143 and the lower segmentation area (B) may be designated along the direction of gravity from the segmentation reference point (S). Alternatively, segmentation areas may be designated with respect to a vertical direction of a screen output on the display unit 151.

For example, when blocking an autorotation setting while viewing the display unit 151 while reclining on a sofa or bed, a lateral direction of the terminal body is toward the direction of gravity but the screen is output vertically. In this instance, the user intuitively recognizes the upper, lower, left and right directions with respect to the display unit and the upper, lower and left and right directions may be set with respect to the screen direction of the display unit. The upper and lower direction of the screen output on the display unit may be designated with respect to output characters. A location of a status bar (260, see FIG. 8C or FIG. 12A) displaying a state of the mobile terminal may be determined as a top end.

Figure 10:
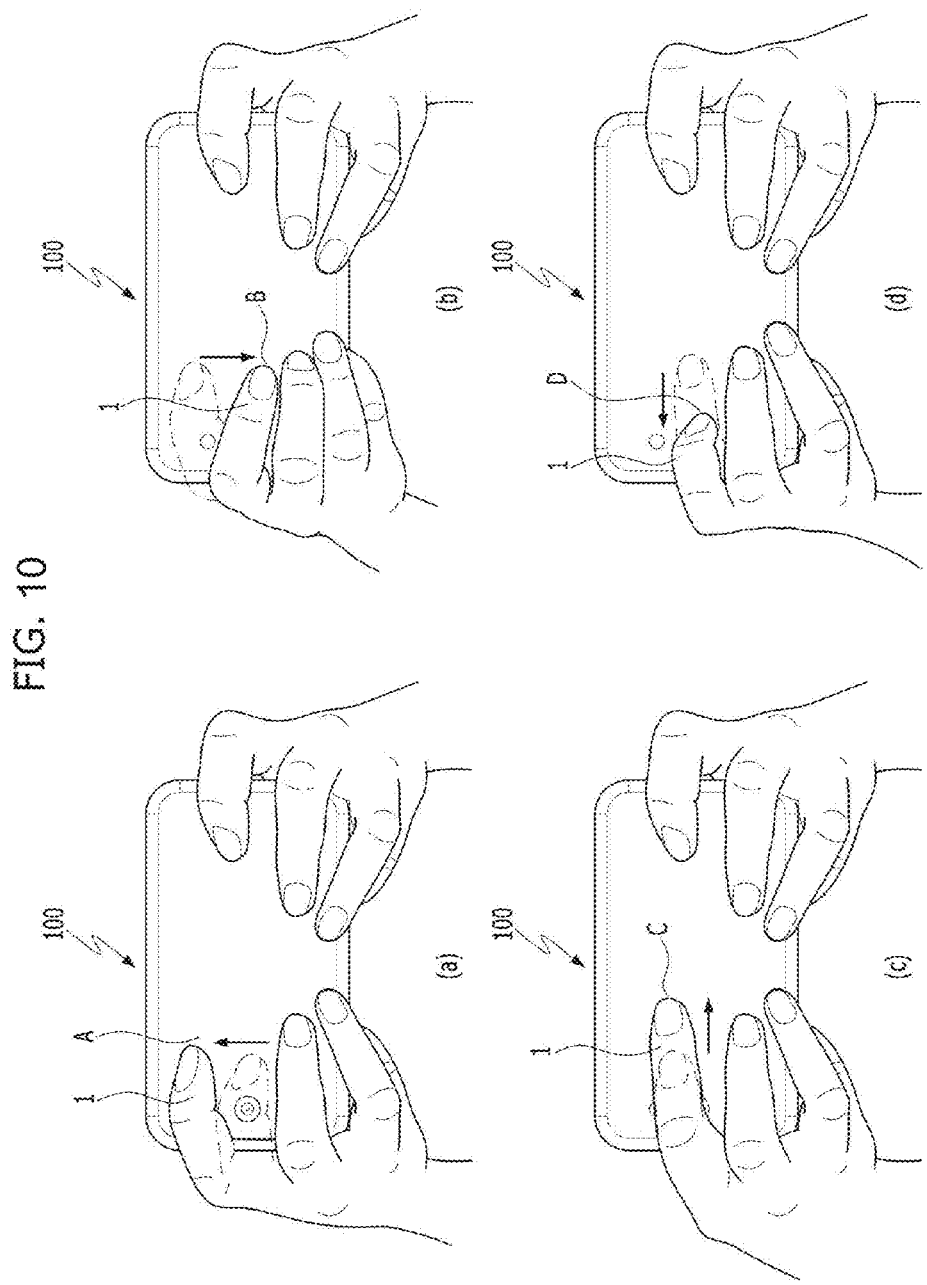
FIG. 10 is a diagram illustrating a rear surface in the embodiment of the base input setting for the mobile terminal in accordance with the present disclosure.

FIGS. 10a through 10d illustrate a method for selecting segmentation areas when the mobile terminal 100 in accordance with the present disclosure is horizontally arranged. A longitudinal direction is arranged as a horizontal direction and a short direction is set as a vertical direction. An upper segmentation area (A) is designated as shown in FIG. 10a and a lower segmentation area (B) is designated as shown in FIG. 10b. A left segmentation area (C) is designated as shown in FIG. 10c and a right segmentation area (D) is designated as FIG. 10d. Accordingly, the user may move the finger 1 and select the segmentation area, while holding the terminal body as shown in the drawings.

Figure 11:
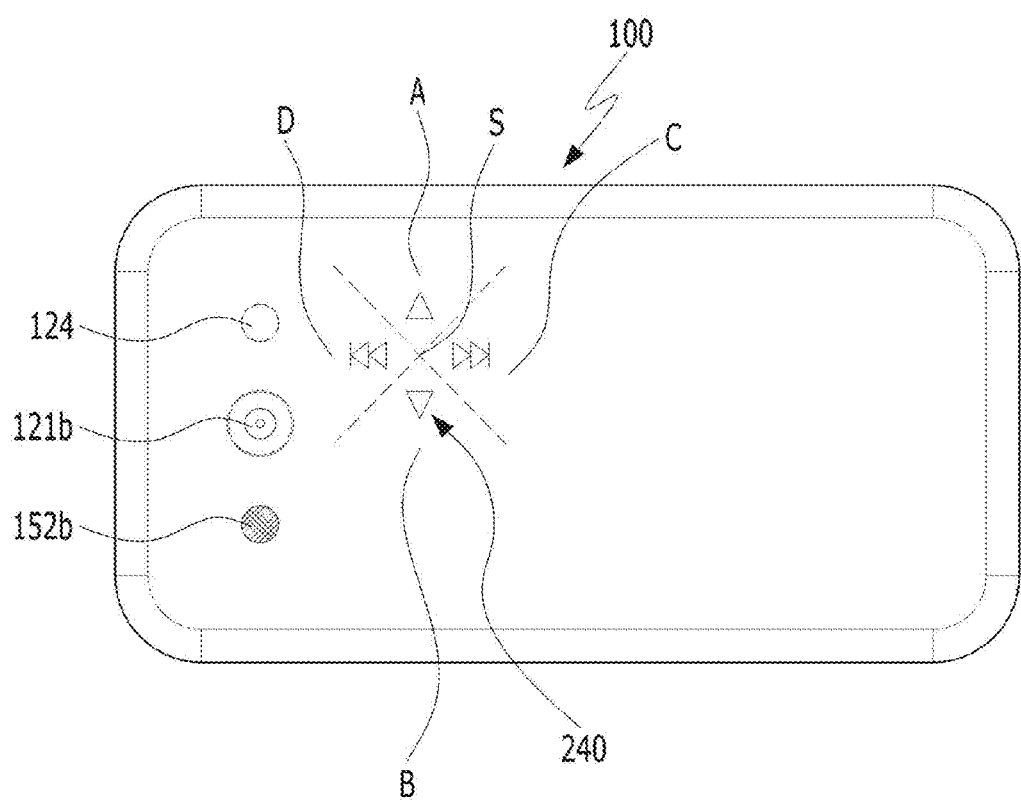
FIG. 11 is a diagram illustrating another embodiment of a method for selecting a segmentation area of the mobile terminal in accordance with the present disclosure.

FIG. 11 is a diagram illustrating a rear surface in another embodiment of segmentation reference point (S) setting for the mobile terminal in accordance with the present disclosure. When the user is viewing a video file, upper and lower segmentation areas (A and B) adjust a volume and a control command for skipping to the former or next file may be designated in left and right segmentation areas (C and D). Even in this instance, an icon showing the function of the segmentation area through the LED matrix 105 provided in the rear surface may be displayed as mentioned above.

Figure 12A:
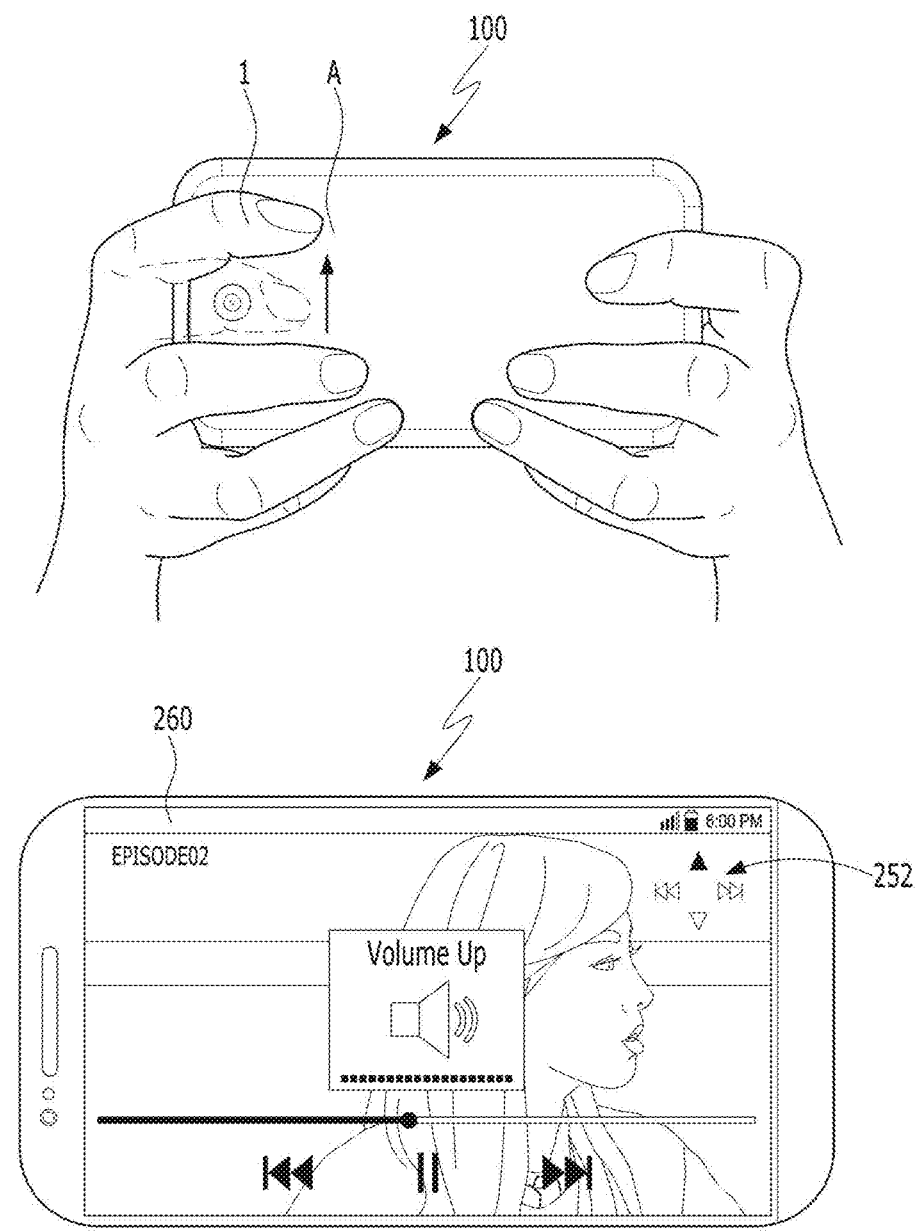
FIGS. 12A through 12D are diagrams illustrating a screen on a display unit based on selection of a segmentation area of the mobile terminal in accordance with the present disclosure.
Figure 12B:
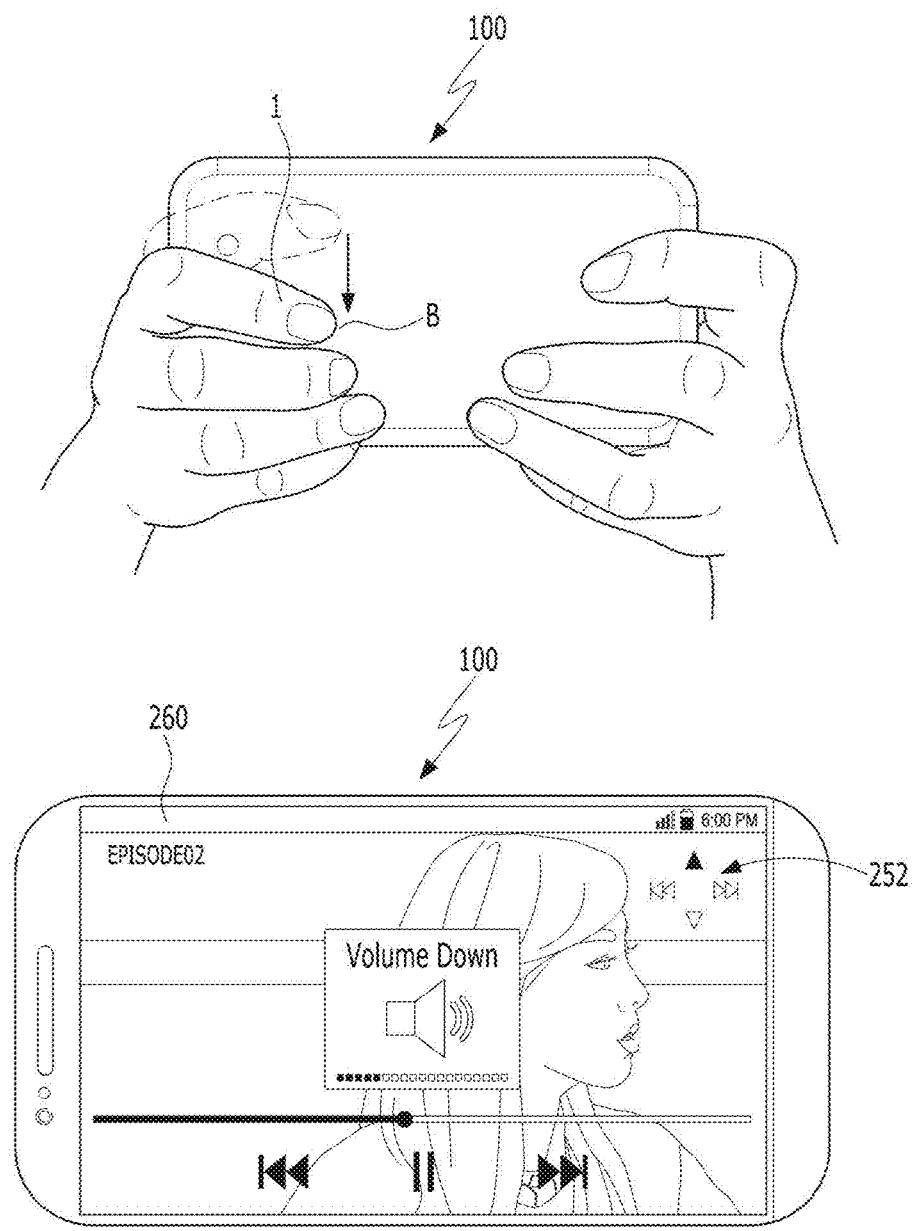

FIGS. 12A through 12D illustrate a screen of the display based on selection of segmentation areas designated in the mobile terminal in accordance with the present disclosure. When an upper segmentation area (A) or a lower segmentation area (B) shown in FIGS. 12A and 12B is selected, a volume may be adjusted vertically.

When left and right segmentation areas (C and D) are selected, the playing rewinds to the former play section or skips to the next play section. Meanwhile, a plurality of commands may be designated based on a method of touch input to each of the segmentation areas. The types of touch inputs may include at least one of tap input for touching the segmentation area one time, touch and drag input for moving slidingly to the segmentation area from the basic input point and long touch input for keeping a segmentation area touching state for a preset time period.

Figure 12C:
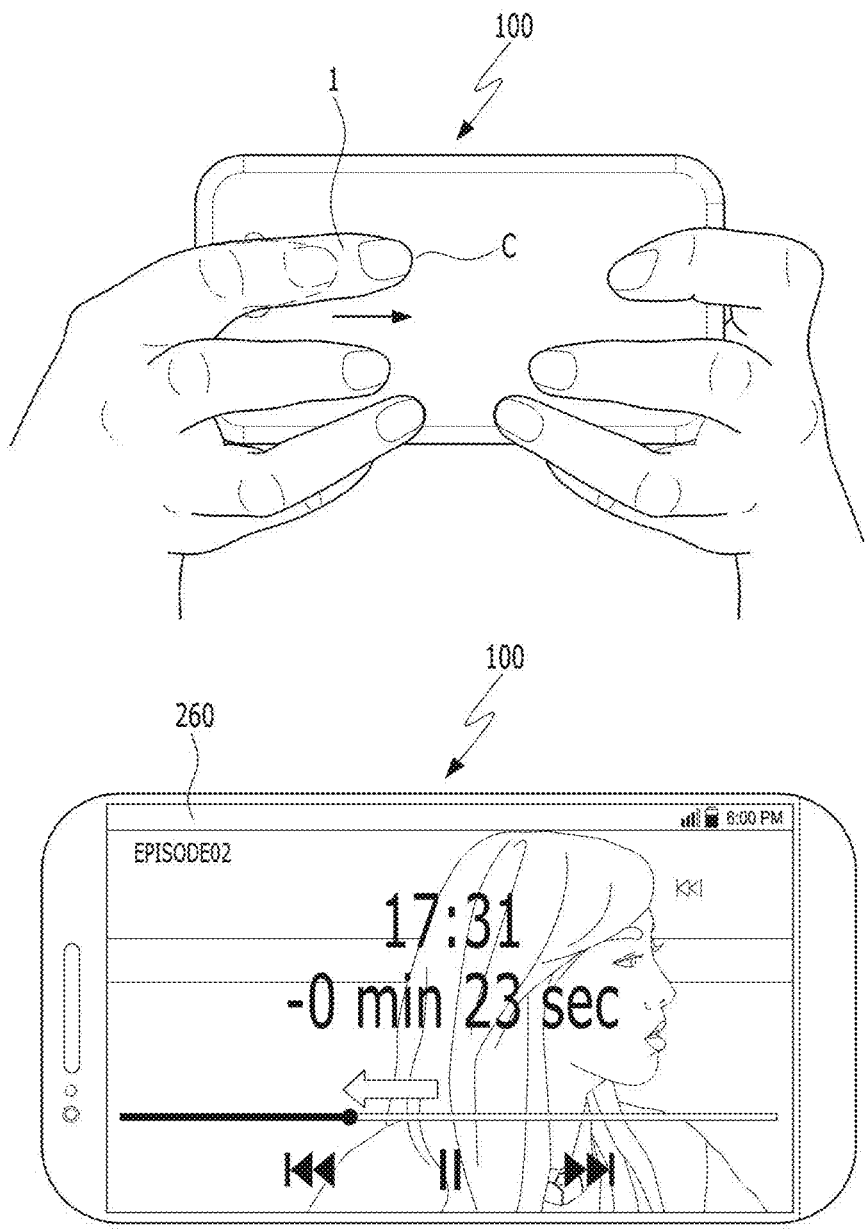
Figure 12D:
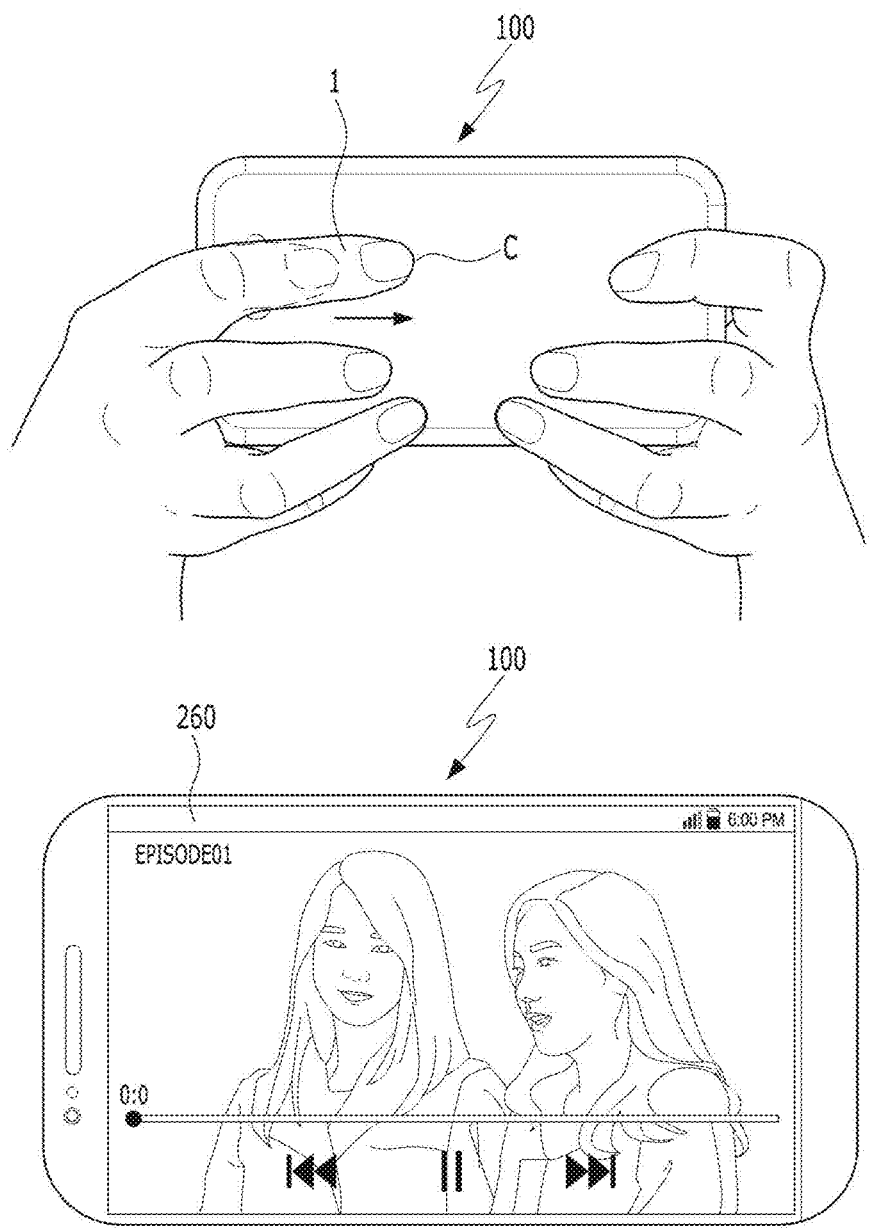
Figure 13A:
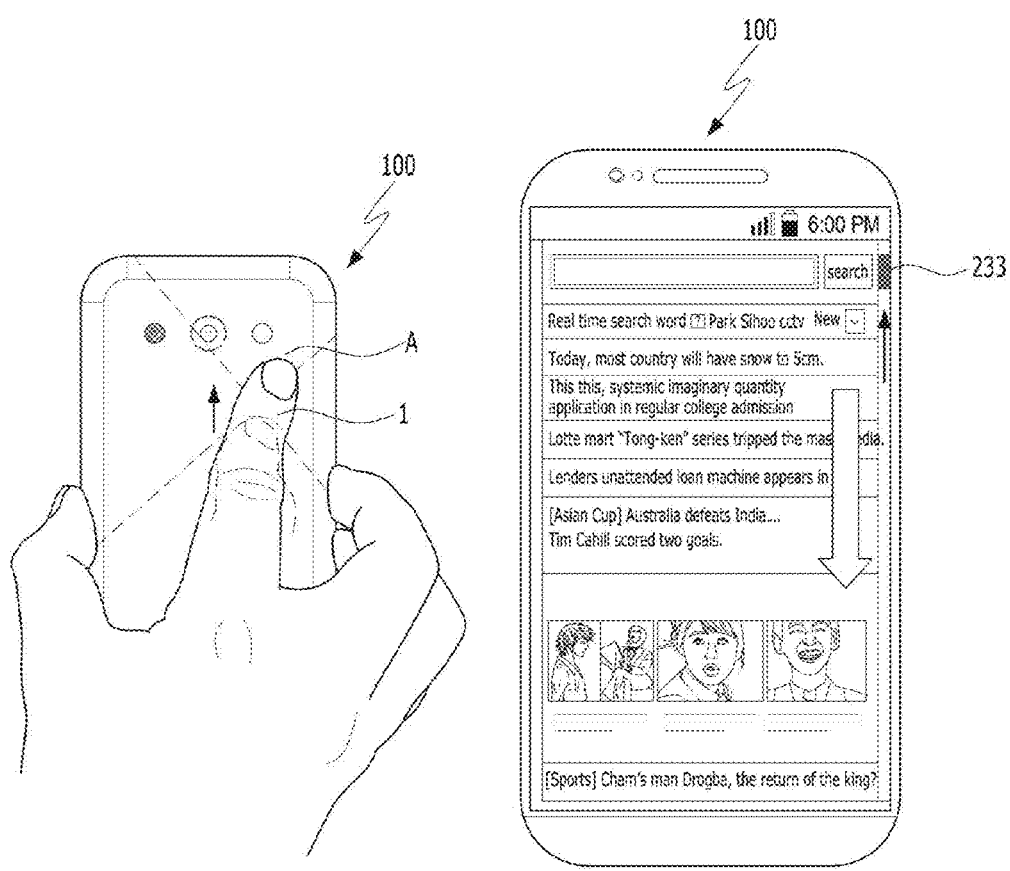
FIGS. 13A through 13D are diagrams illustrating a screen on a display unit based on input of a segmentation area of the mobile terminal, while an application for providing a document or web browser is executed.
Figure 13B:
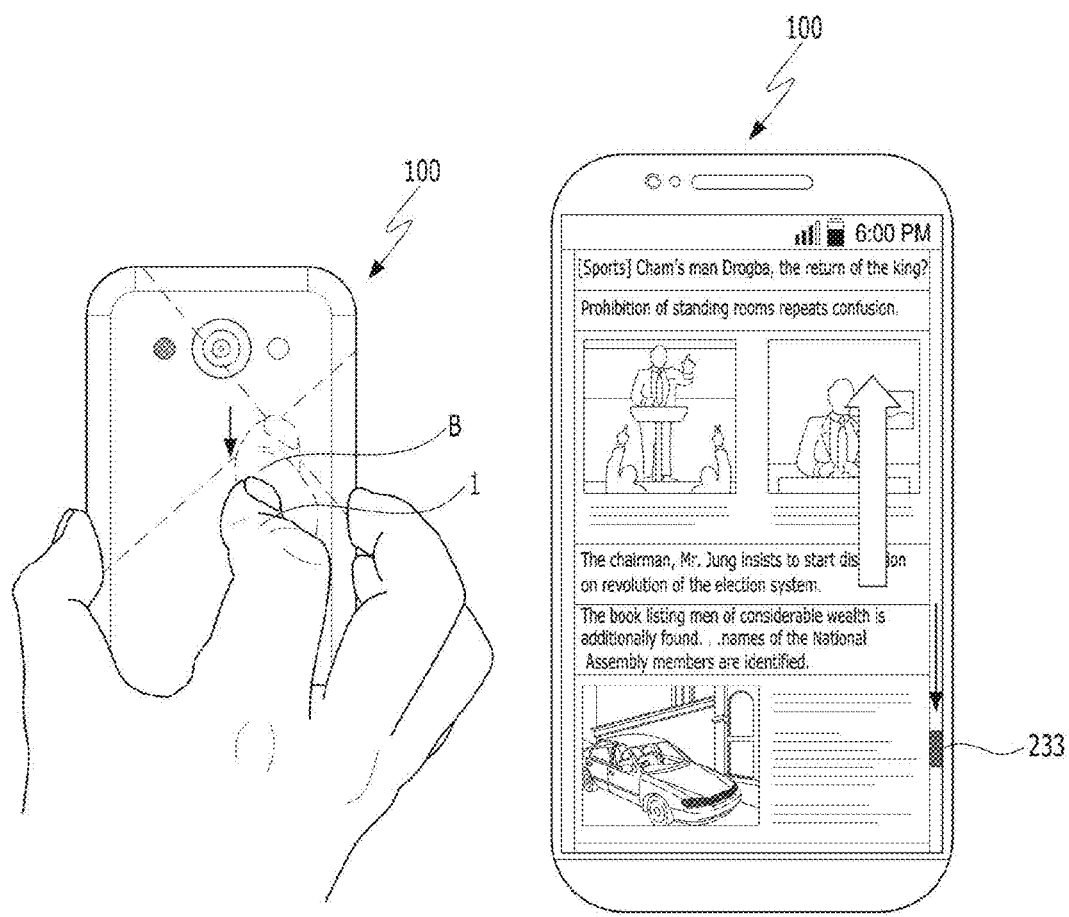
Figure 13C:
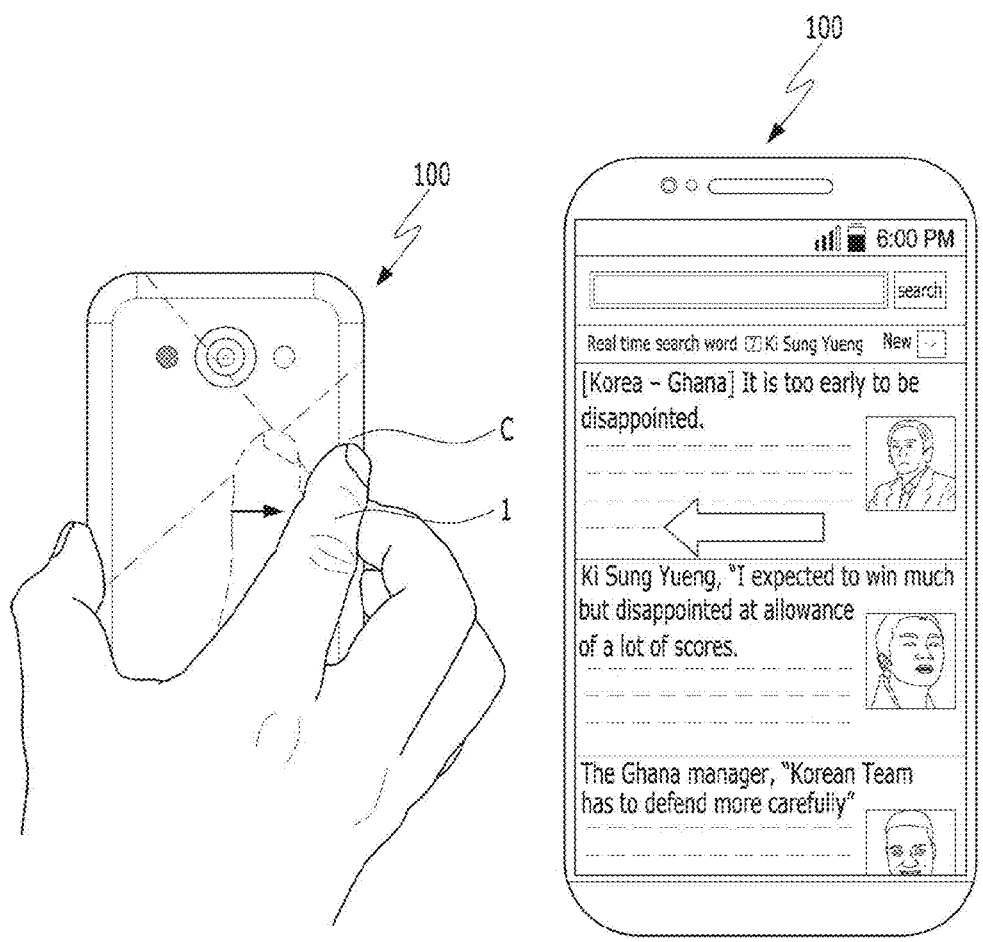
Figure 13D:
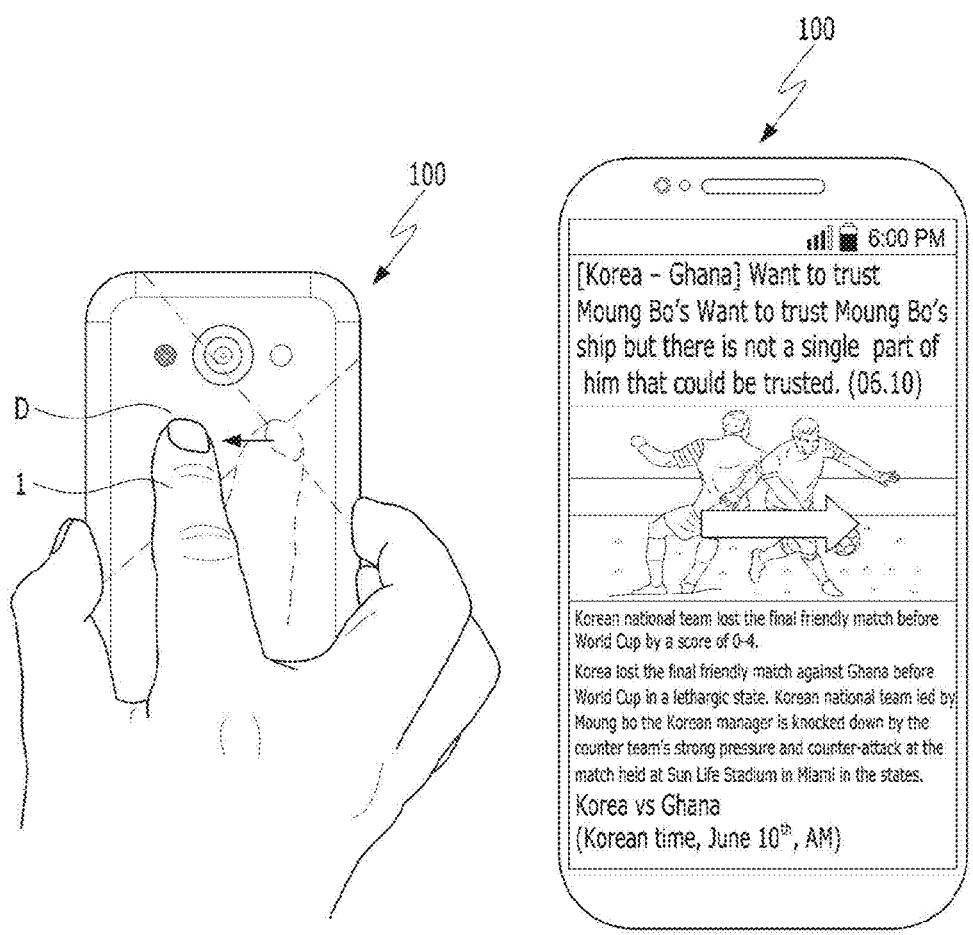

For example, when the tap input is sensed by short touching of the left segmentation area (C), the former play section may rewind and play as shown in FIG. 12C. When a long touch input is sensed by long touching of the left segmentation area (C), a video file located in the front of the video file list may play as shown in FIG. 12D.

FIGS. 13A through 13D illustrate a screen of the display unit 151, when the segmentation area of the mobile terminal in accordance with the present disclosure is selected when screen larger than the display unit 151 is partially output on the display unit 151. In this embodiment, a vertically larger web browser is shown. When the upper segmentation area (A) is selected, the screen displayed on the display unit 151 to display an upper portion of the whole screen is moved downward and the screen located upper than the screen shown in the lower is shown on the display unit 151. A scroll bar showing the location of the screen displayed on the full screen may be moved upward, when the upper segmentation area (A) is selected.

In contrast, when the lower segmentation area (B) is selected, the screen displayed on the display unit 151 to show a lower portion of the whole screen is moved upward and the screen located lower is displayed on the display unit 151. A scroll bar 233 may be moved downward, when the lower segmentation area (B) is selected. When the left segmentation area (C) and the right segmentation area (D) are selected in case a large screen is provided on the display unit 151 in a left and right direction, the screen may be displayed on the display 151, similar to the screen displayed when the upper segmentation area (A) and the lower segmentation area (B) mentioned above are selected.

When the left segmentation area (C) is selected when seeing a document having a plurality of screens or a web browser, the former page or the former opened web page is shown. When the right segmentation area (D) is selected, the next page or a screen of the next web page in case the currently shown page is turned back may be output on the display unit 151.

Figure 14A:
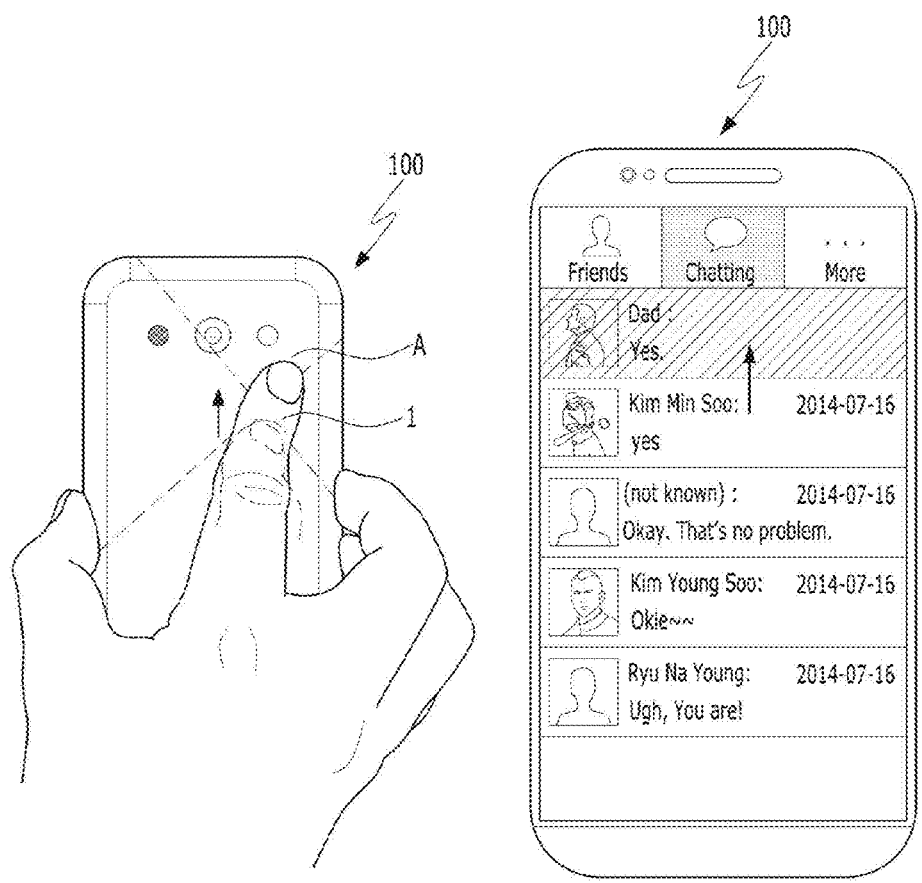
FIGS. 14A through 14D are diagrams illustrating a screen on a display unit based on input of a segmentation area of the mobile terminal in accordance with the present disclosure, while an application related with a message is executed.
Figure 14B:
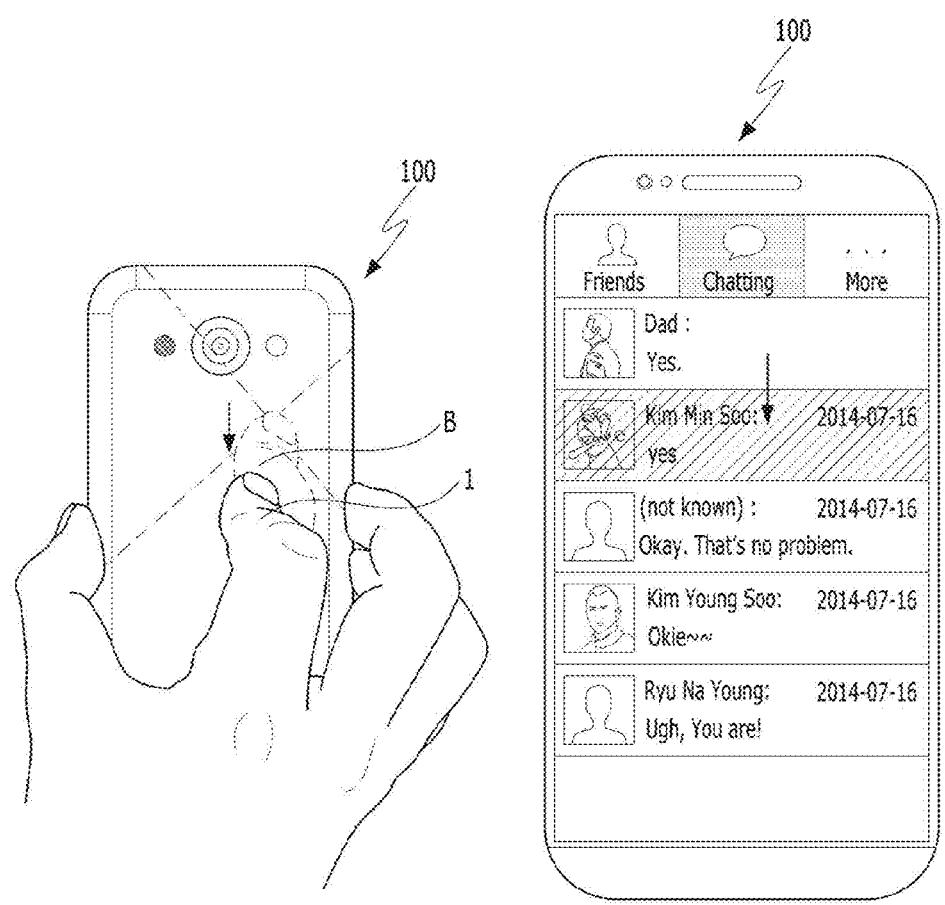

FIGS. 14A through 14D illustrate a screen output on the display unit when the segmentation area of the mobile terminal is input on a list of a plurality of items. When sensing touch input for setting a segmentation reference point (S) in the second touch pad 125, the controller may designate segmentation areas in the second touch pad 125. When an upper segmentation area (A) is selected as shown in FIG. 14A, an item located higher than the item currently selected on the list may be controlled to be selected.

Figure 14C:
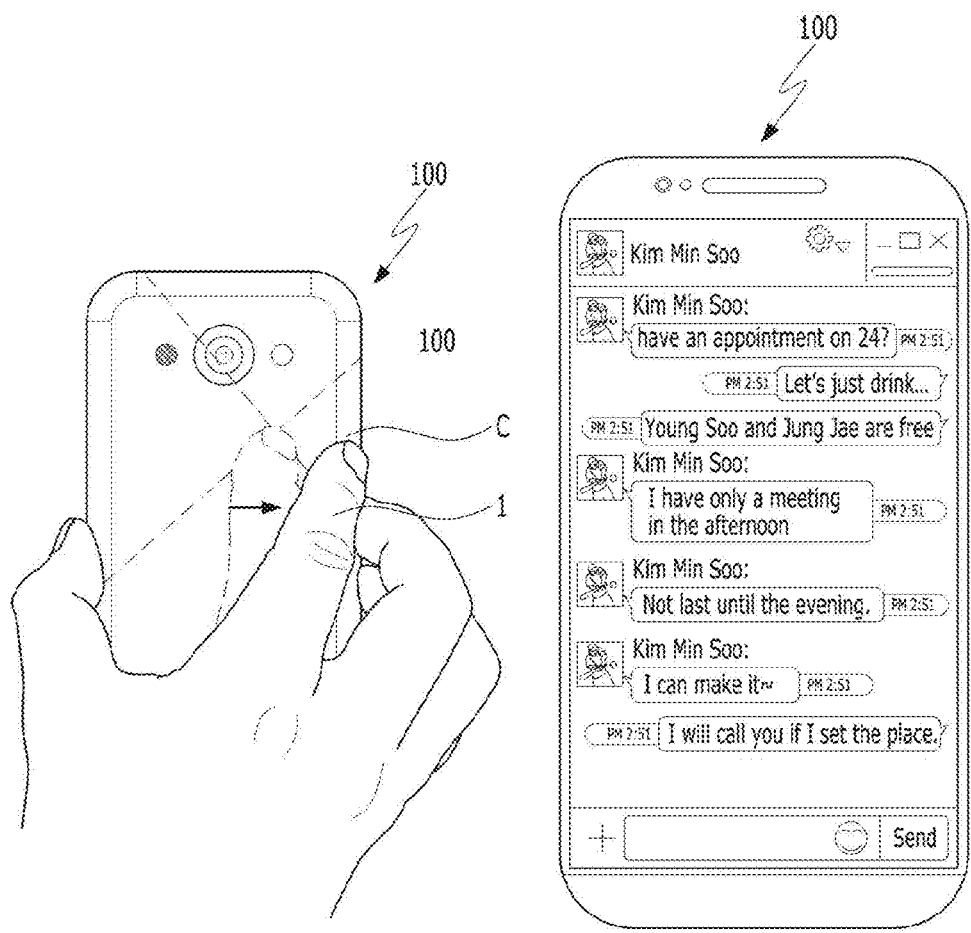
Figure 14D:
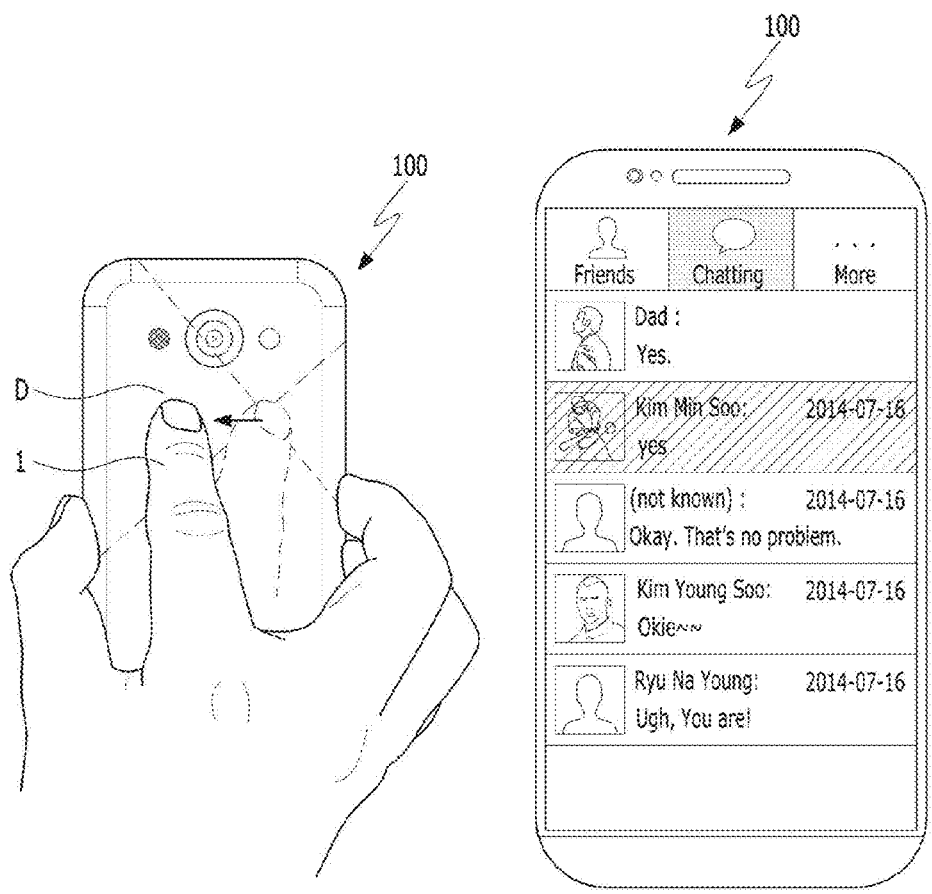

When a lower segmentation area (B) is selected, an item lower than the item currently selected on the list may be controlled to be selected. Even when user selects a left segmentation area (C), the selected item may be controlled to be executed or to enter into a lower menu as shown in FIG. 14C. When a right segmentation area (D) is selected, it is controlled to return to the list.

Figure 15A:
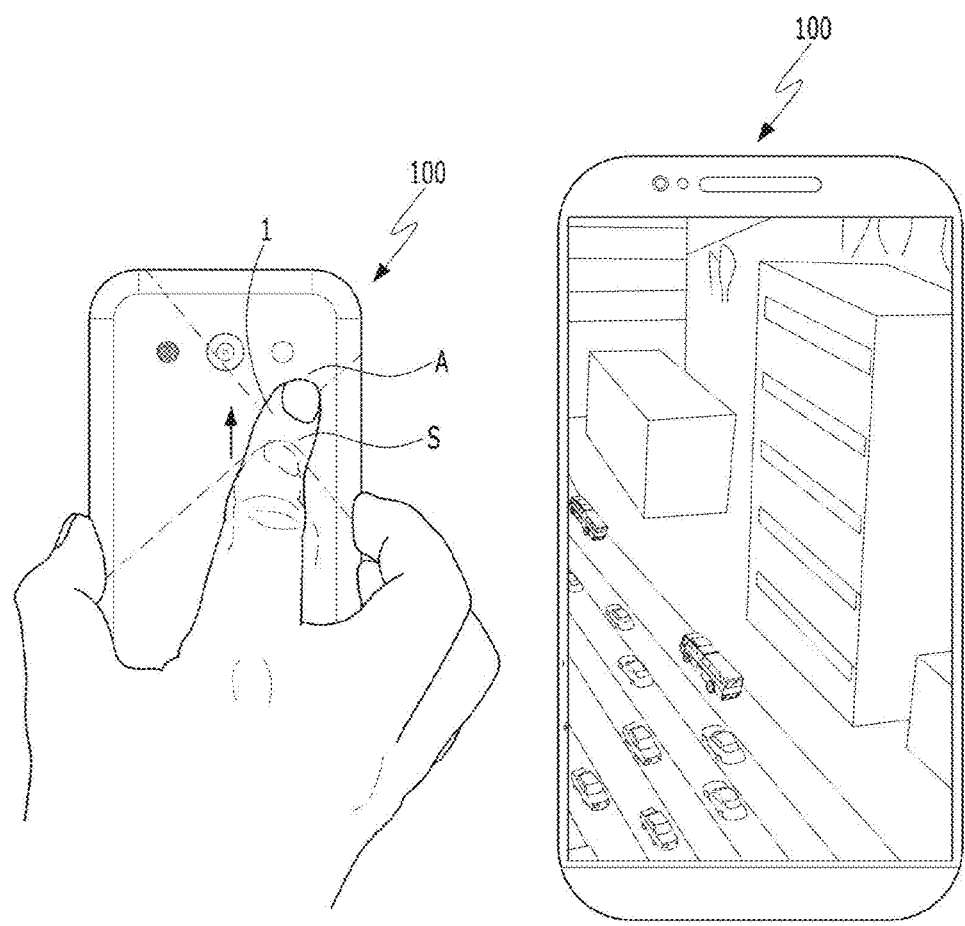
FIGS. 15A through 15D are diagrams illustrating a screen on a display unit based on input of a segmentation area of the mobile terminal in accordance with the present disclosure, while a camera is operated.
Figure 15B:
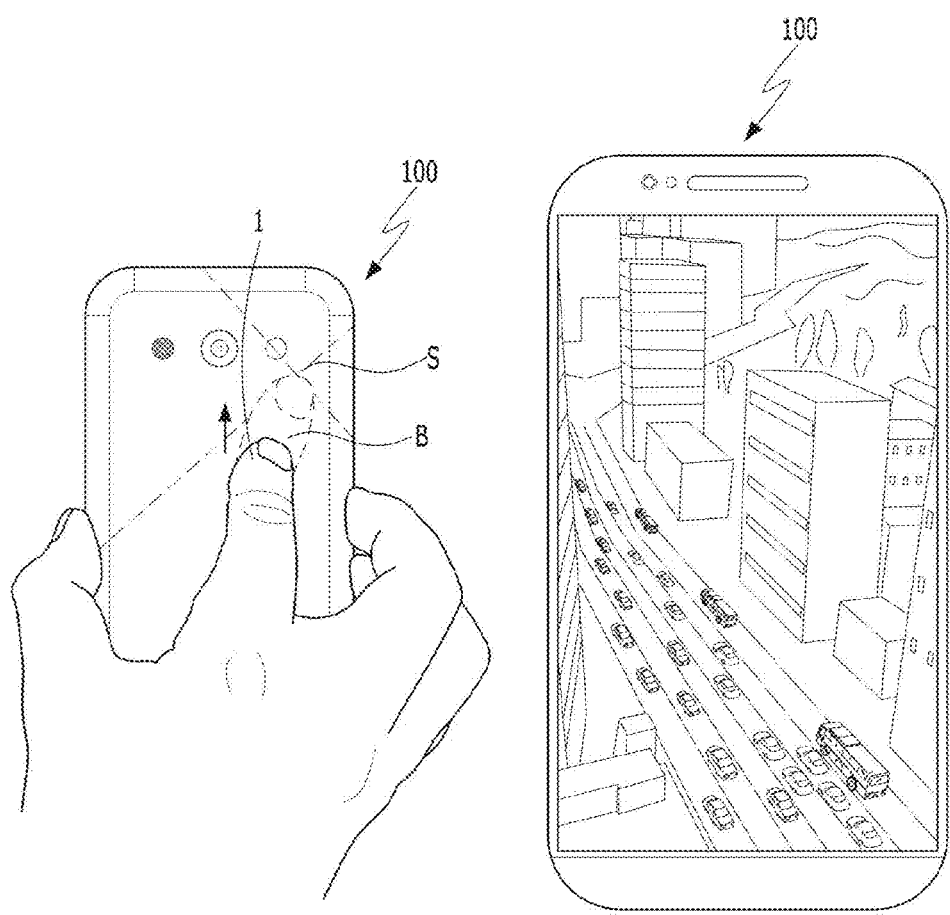
Figure 15C:
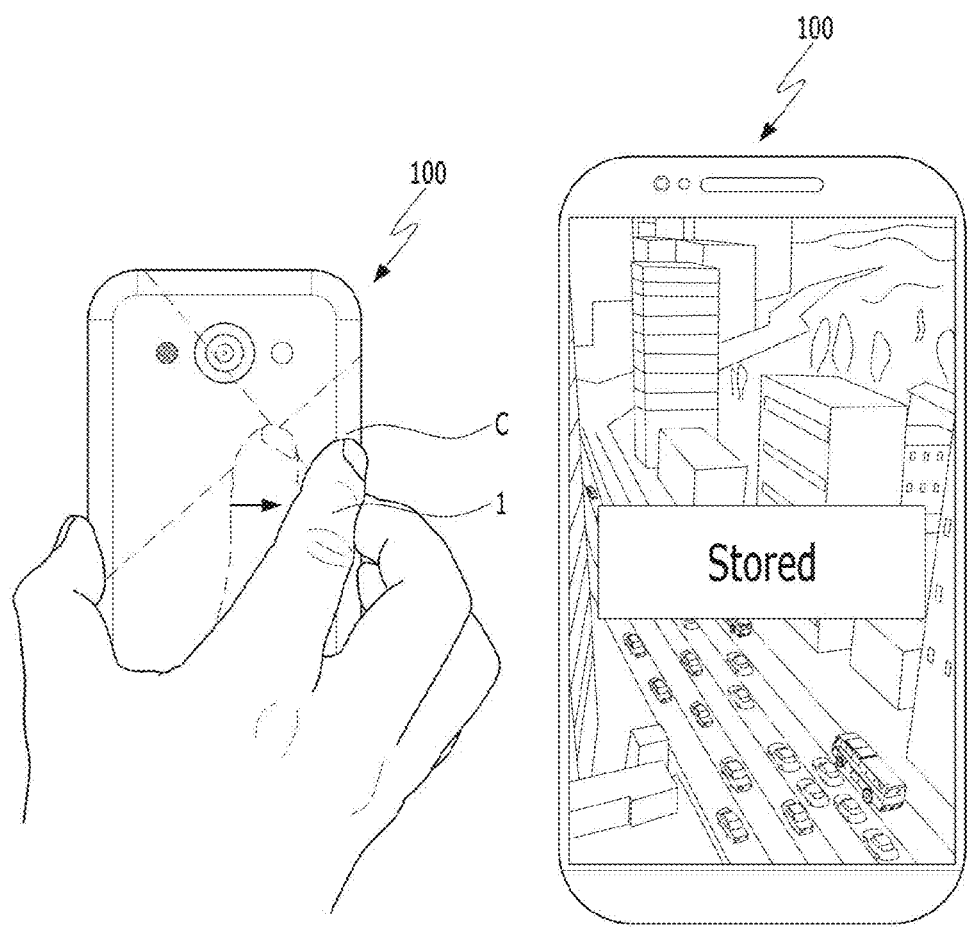

FIGS. 15A through 15D are diagrams illustrating a screen of the display unit based on input of a segmentation area provided in the mobile terminal in accordance with the present disclosure, when a camera is operated. When an upper segmentation area (A) is selected as shown in FIG. 15A illustrating the display unit 151 while a camera application is executed, the screen is zoomed in to be enlarged. When a lower segmentation area (B) is selected as shown in FIG. 15B, the screen is zoomed out to be reduced.

At this time, when one segmentation area (A) is selected first as shown in FIG. 15A, touch input for selecting other segmentation areas after that is reset as a segmentation reference point (S) and division of the segmentation areas with respect to the reset segmentation reference point (S) may be reset as shown in FIG. 15B.

Figure 15D:
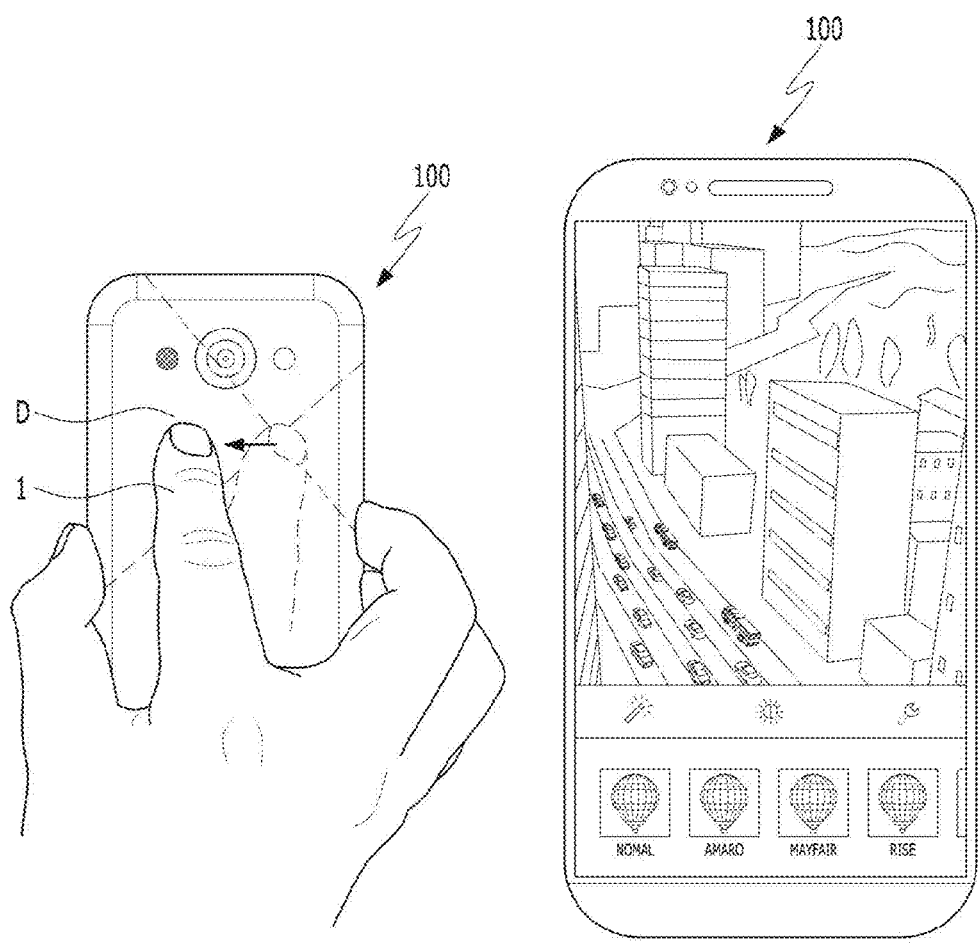

When a left segmentation area (C) is selected, the screen input via the camera may be stored in the current screen displayed on the display unit. In other words, photographing may be performed. When a right segmentation area (D) is selected, a camera mode may be changed as shown in FIG. 15D. When the right segmentation area (D) is selected not only before photographing but also after photographing, the stored image may be edited or a photographic effect may be applied to the stored image.

Figure 16A:
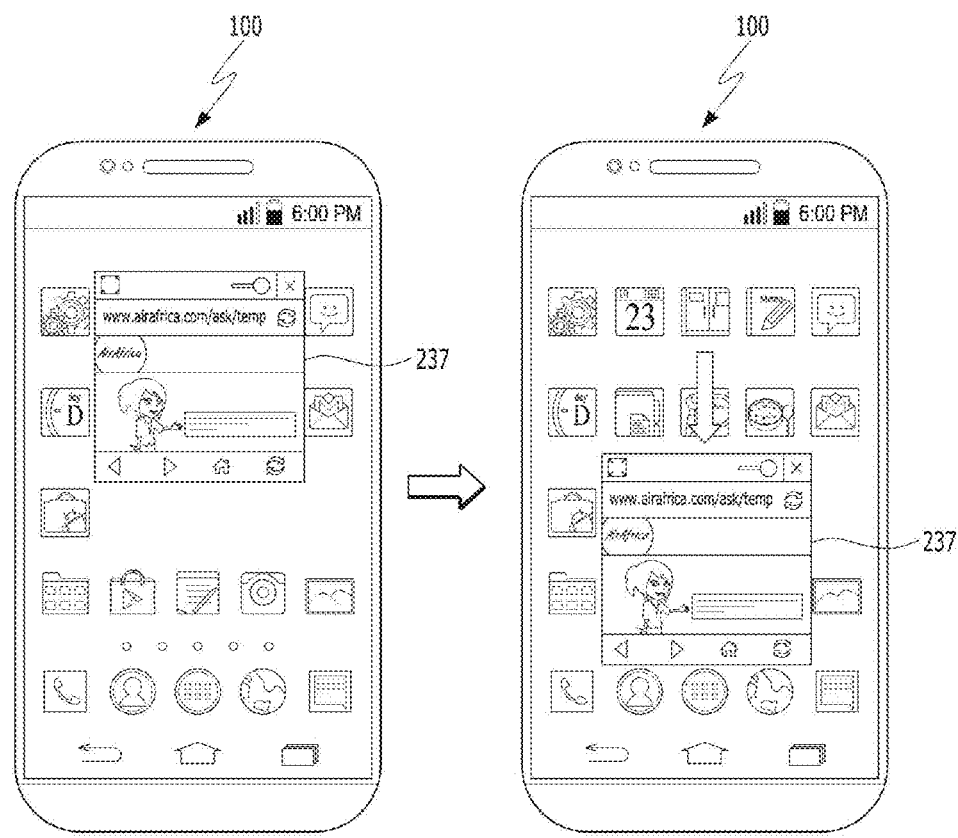
FIGS. 16A through 16C are diagrams a screen on a display unit based on input of a segmentation area of the mobile terminal in accordance with the present disclosure, while a floating window is provided.
Figure 16B:
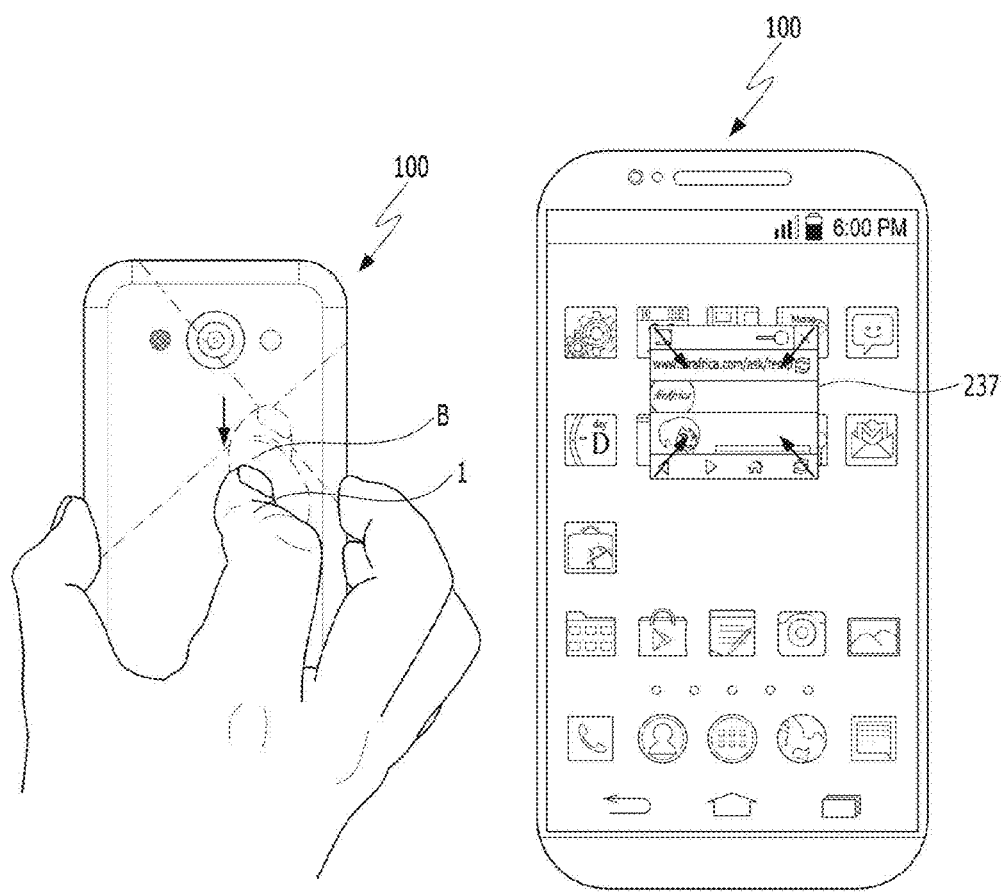
Figure 16C:
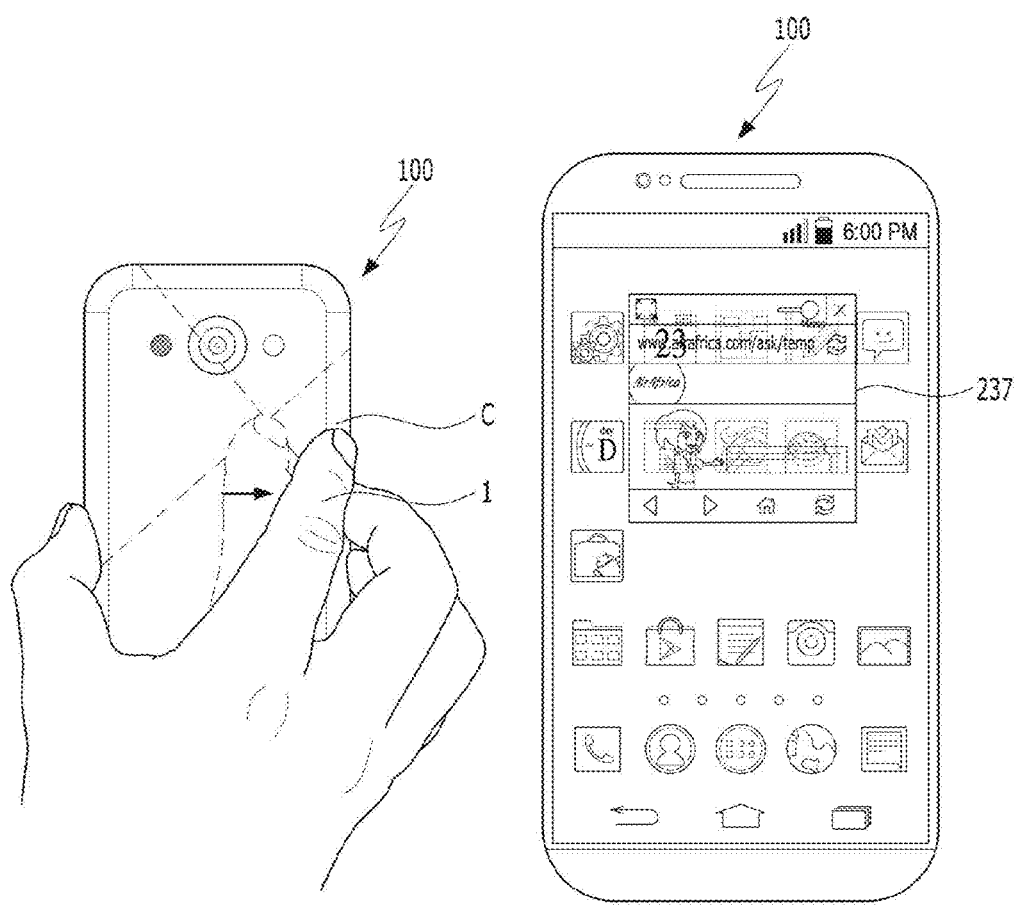

FIGS. 16A through 16C are diagrams illustrating a screen of the display 151 based on input of a segmentation area provided in the mobile terminal in accordance with the present disclosure, when a floating window 237 is provided. As shown in FIG. 16A, a different application from the screen displayed on a rear surface of the floating window 273 is operated in the floating window 237. A plurality of applications may be displayed on the display unit, using the floating window 237. Multitasking is enabled in the mobile terminal and availability of the floating window 237 is getting increased.

When the floating window 237 is provided as shown in FIG. 16A, a segmentation reference point (S) is set and one of upper, lower, left and right segmentation areas is selected after that. In this instance, the flowing window 237 may be moved in the selected direction. In the drawing, it is checked that the floating window 237 is moved downward after the lower segmentation area is selected.

When the floating window 237 is selected, using the first touch pad 124 of the front surface, a different control command from the control command for moving the floating window 237 may be designated. In this embodiment, when an upper segmentation area (A) or a lower segmentation area (B) of the second touch pad 125 is selected, the size of the floating window 237 may be adjusted. When a left segmentation area (C) or a right segmentation area (D) is selected, a transparency level of the floating window 237 may be adjusted.

Figure 17A:
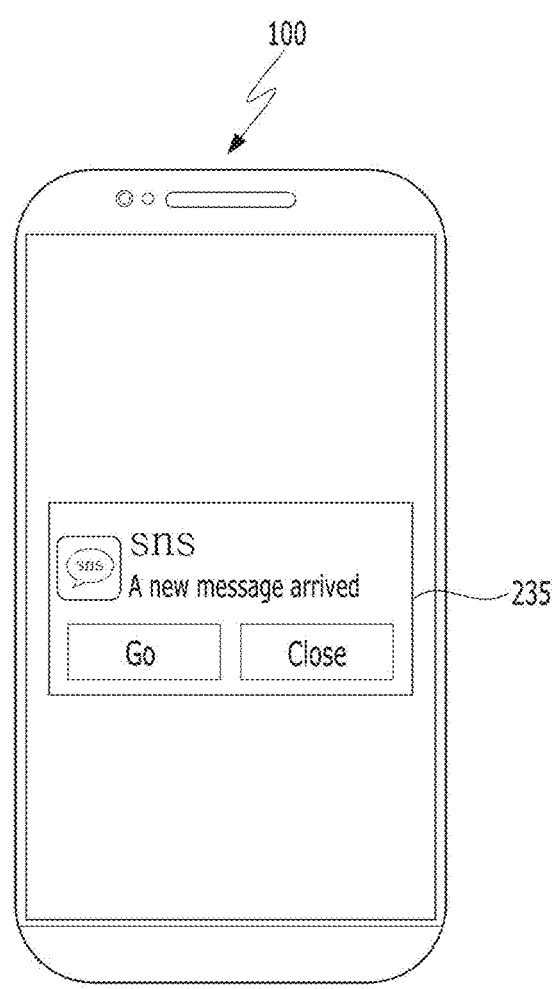
Figure 17B:
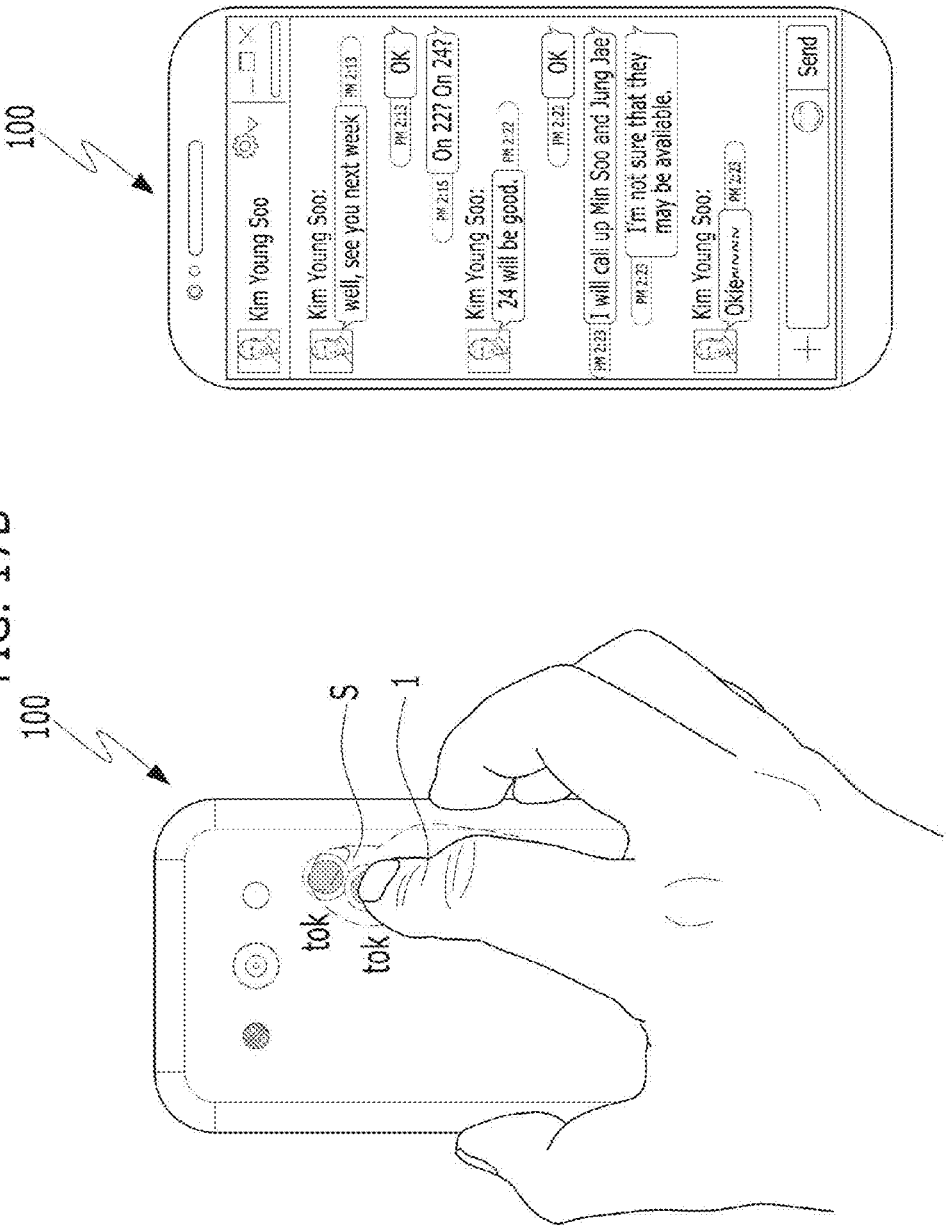

FIGS. 17A through 17C are diagrams illustrating a screen output on the display unit 151 when a segmentation area of the second touch pad 125 in accordance with the present disclosure is selected in case a notification message window 235 is displayed on the screen. When receiving a new message or a notification is generated in a state where the screen is turned off owing to usage of another application or non-usage of the mobile terminal 100, the notification message window 235 shown in FIG. 17A is popped up. At this time, when the user continuously touches a right portion seen from the rear surface shown in FIG. 17B or draws a specific pattern to set a segmentation reference point (S), the message received on the display unit 151 may be output on the screen or a function related with the notification message window may be performed.

When the user continuously touches a left portion seen from the rear surface shown in FIG. 17C or draws a specific pattern to set a segmentation reference point (S'), the notification message window 235 may be closed and returns to an original state. The basic input shown in FIG. 17A is for setting a segmentation reference point (S) and designating segmentation areas from the segmentation reference point (S) (S20). The basic input shown in FIG. 14C is for performing only a function of closing the notification window 235 and not for designating segmentation areas.

The touch input for closing the notification window 235 and the basic input for setting the segmentation reference point (S) may be distinguished from each other based on the location of the basic input or the pattern of the basic input. When a continuous touch input is sensed, with a message notification window 235 popped up on the screen, a corresponding message is open. When touch input made by drawing of a specific pattern is sensed, the notification window 235 may be closed.

Figure 18A:
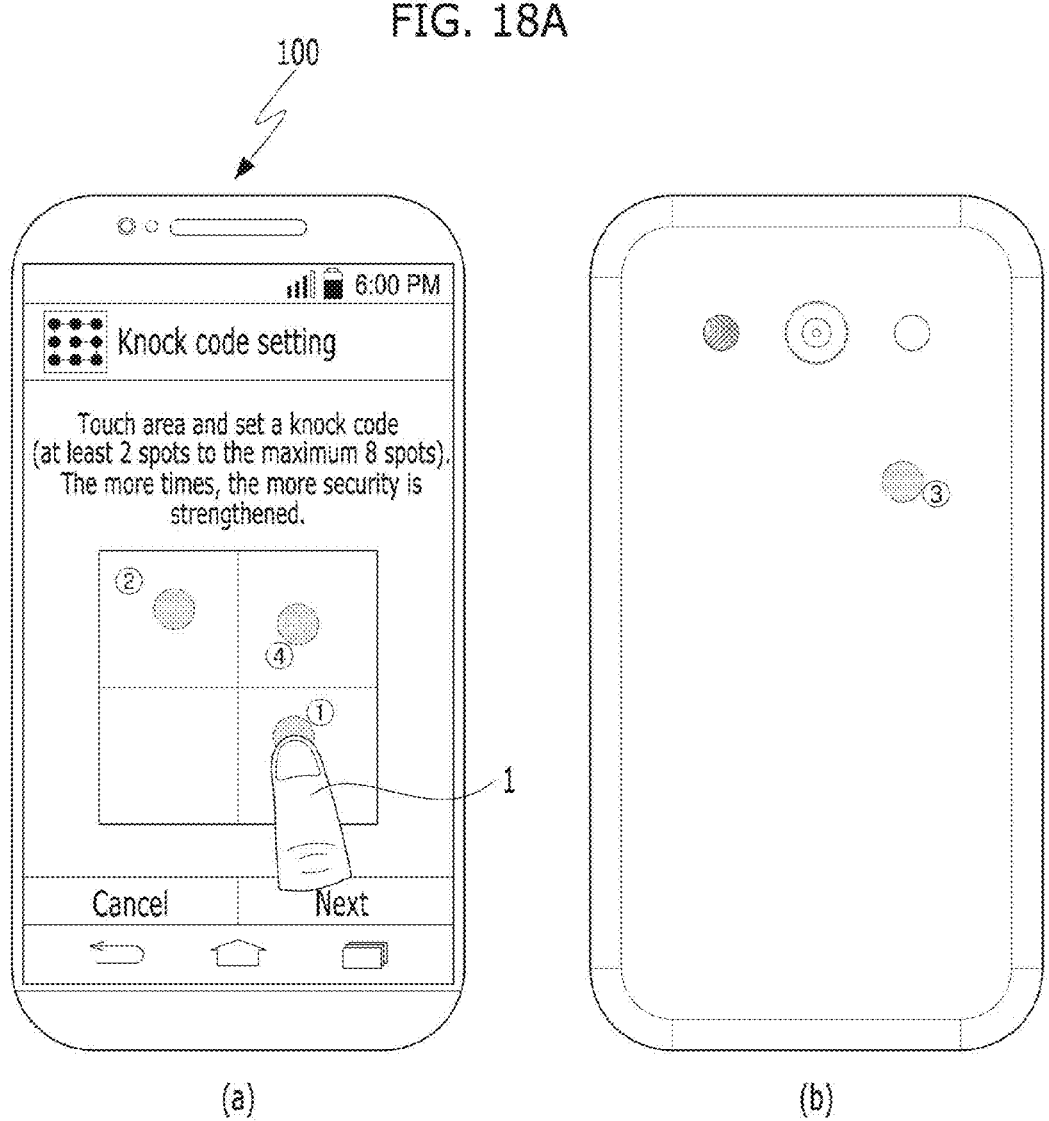
FIGS. 18A through 18C are diagrams illustrating a screen on a display unit based on input of a segmentation area of the mobile terminal in accordance with the present disclosure.
Figure 18B:
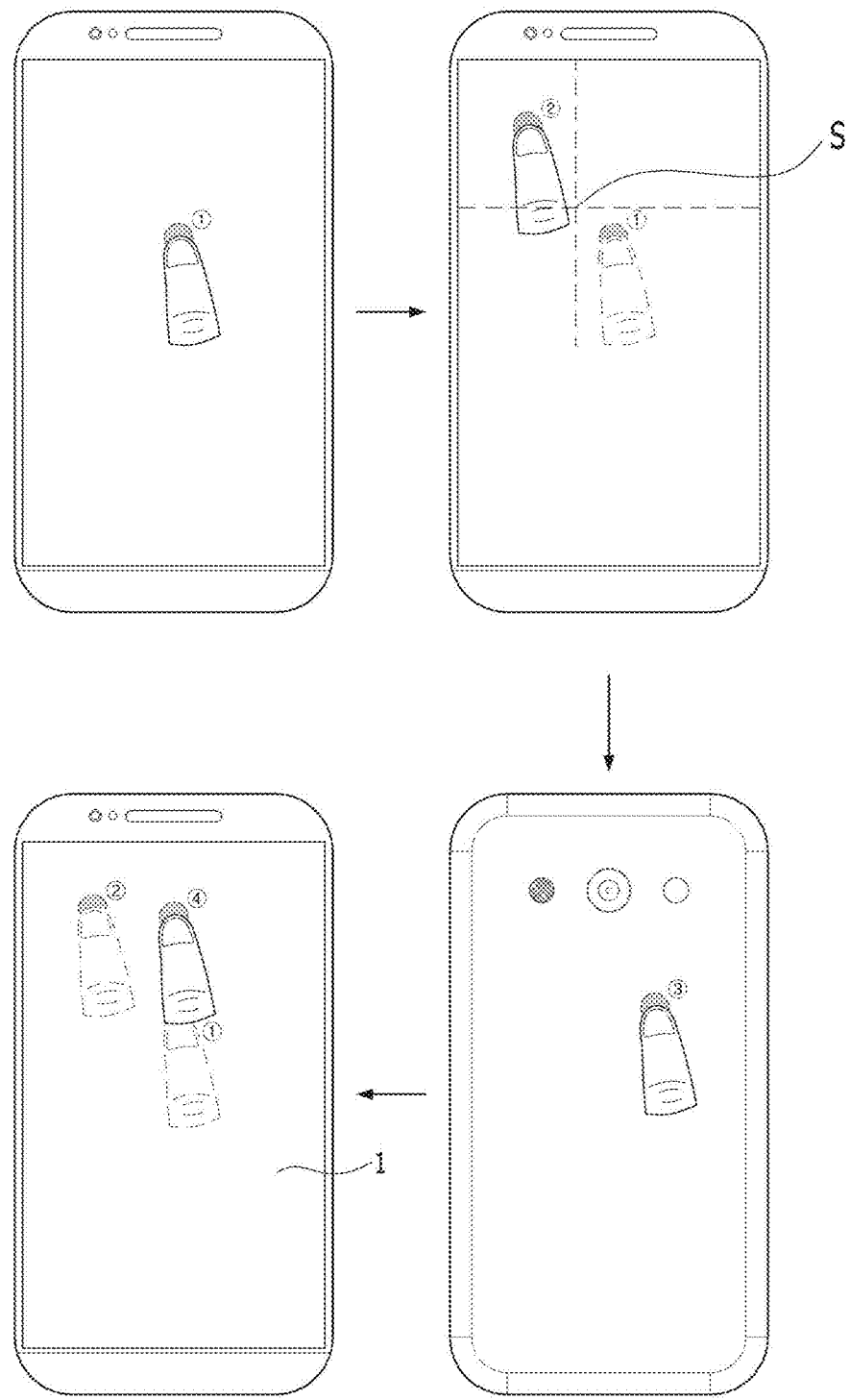
Figure 18C:
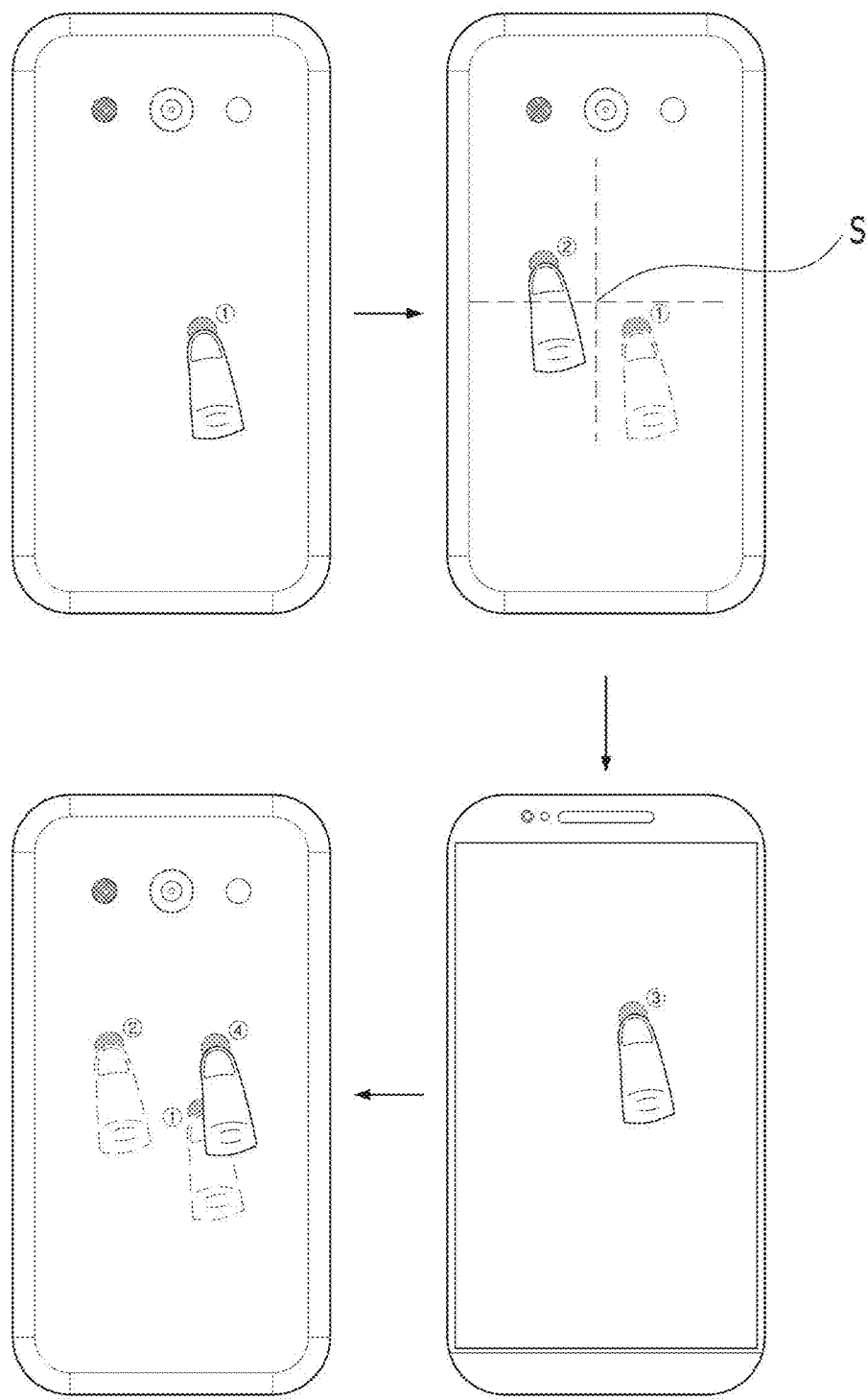

FIGS. 18A through 18C are diagrams illustrating a screen of the display unit 151 based on input of segmentation areas provided in the mobile terminal in accordance with the present disclosure. As both the first touch pad 124 provided in the front surface and the second touch pad 125 provided in the rear surface are provided, a unlock touch pattern of the mobile terminal may be may be set, using both of the first and second touch pads 124 and 125.

As shown in FIG. 18A, the user may perform touch input (①②③④) to the first touch pad and the second touch pad 125 sequentially and designate a unlock touch pattern. To unlock, touch input (①②③④) are sequentially sensed in the first touch pad 124 of the front surface and the second touch pad 125 of the rear surface in accordance with the order of the unlock touch pattern shown in FIG. 18B. After that, the locked state of the mobile terminal may be released. The first touch input (①) point and the second touch input (②) may be the basic input. A segmentation reference point (S) for dividing areas may be set based on the position of the first touch input (①) and the position of the second touch input (②). As shown in FIG. 18A, the first touch input (①) and the second touch input (②) are located on a diagonal line in four divided segmentation areas. Accordingly, when the first touch input (①) and the second touch input (②) are input, a point located between the two touch input points may be designated as the segmentation reference point (S). Segmentation areas are divided with respect to the segmentation reference point (S) and following touch inputs (③④) are sensed in the segmentation areas in accordance with a preset order, only to release the locked state.

The basic input for setting the segmentation reference point (S) may be set after touch input two times. For the precise unlock, touch input performed three times or more may be recognized as the basic input and the segmentation reference point (S) may be set after touch input is performed three times or more. As shown in FIG. 18C, regardless of the first touch pad or the second touch pad 125 where the first touch input (①) of the unlock touch pattern is sensed, the first touch pad sensing the touch input initially may sense a relative position and recognize the unlock touch pattern. Accordingly, even when the initial touch input is sensed in the second touch pad 125 of the rear surface as shown in FIG. 18C, the second touch input (②) and the fourth touch input (④) are sensed in the second touch pad 125, and the third touch input (③) may be sensed in the first touch pad. In this instance, the locked state may be released.

As mentioned above, in at least one embodiment of the mobile terminal in accordance with the present invention, the user may input the control command, with holding the mobile terminal in the hand, using the touch sensor provided in the rear surface. Furthermore, in at least one embodiment of the mobile terminal in accordance with the present disclosure, the user may input the control command, with holding the mobile terminal in the hand, using the touch sensor provided in the rear surface.

The foregoing embodiments are merely and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a case having a front surface and a rear surface;
a touch screen and first touch pad provided in the front surface of the case;
a second touch pad provided in the rear surface of the case; and
a controller configured to:
set an end point of a basic touch input on the second touch pad as a touch point, the basic touch input is a continuous touch input or a pattern touch input,
divide an area of the second touch pad into at least first and second control command areas based on the touch point, the first control command area is located in a left direction from the touch point on the second touch pad and the second control command area located in a right direction from the touch point on the second touch pad,
set first and second control commands to the first and second command areas, respectively,
control the mobile terminal according to the first control command in response to a continuous touch input from the touch point into the first control command area, and
control the mobile terminal according to the second control command in response to a continuous touch input from the touch point into the second control command area,
wherein the first control command comprises moving a screen of the touch screen in a right direction or moving a scroll to the right direction, and
wherein the second control command comprises moving a screen of the touch screen in a left direction or moving a scroll to the left direction.

2. The mobile terminal of claim 1, further comprising:
a gyro-sensor configured to sense a motion of the mobile terminal,
wherein the controller sets the touch point when the gyro-sensor senses a first motion.

3. The mobile terminal of claim 2, wherein the controller is further configured to cancel the divided area of the second touch pad, when the gyro-sensor senses an additional motion of the mobile terminal.

4. The mobile terminal of claim 1, wherein the controller is further configured to cancel the divided area of the second touch pad, when a preset time period passes after sensing the basic touch input or when sensing an end input.

5. The mobile terminal of claim 1, wherein the controller is further configured to re-set areas of the divided area of the second touch pad based on a position of the additional touch input in the first or second control command areas.

6. The mobile terminal of claim 1, wherein the controller is further configured to:
cancel the setting of the second control command in response to the additional touch input in the first control command area, and
set the first control command on a whole area of the second touch pad.

7. The mobile terminal of claim 1, wherein the controller is further configured to:
change the first and second control commands into different control commands when additionally sensing the basic touch input from the second touch pad.

8. The mobile terminal of claim 1, wherein the controller is further configured to divide the first and second control command areas at a uniform angle with respect to the touch point.

9. The mobile terminal of claim 1, wherein the controller is further configured to divide the area of the second touch pad into:
a third control command area located in a third direction rotated 90 degrees from the first direction along a clockwise direction, and
a fourth control command area located in a fourth direction rotated 90 degrees from the second direction along the clockwise direction.

10. The mobile terminal of claim 1, wherein the controller is further configured to display an indicator on the touch screen indicating the first and second control commands set to the first and second control command areas.

11. The mobile terminal of claim 1, wherein the controller is further configured to set a plurality of control commands in the first or second control command area based on a type of the additional touch input in the first or second control command areas.

12. The mobile terminal of claim 11, wherein the type of the touch input includes at least one of single tap input, a touch and drag input, and long touch input.

13. The mobile terminal of claim 1, wherein of the controller is further configured to:
enter a locked state of the mobile terminal, and
release the locked state when the basic touch input occurs in the first and second control command areas in a preset order.

14. The mobile terminal of claim 1, wherein the second touch pad is located an upper portion of the rear surface of the mobile terminal.

15. The mobile terminal of claim 1, further comprising:
a Light Emitting Diode (LED) matrix disposed in an inner surface of the second touch pad, the LED matrix comprising a plurality of LEDs configured to emit light,
wherein the controller is further configured to output a specific character, image and figure using the LED matrix for the basic touch input.

* * * * *